US010140311B2

(12) United States Patent
Li et al.

(10) Patent No.: US 10,140,311 B2
(45) Date of Patent: Nov. 27, 2018

(54) SYSTEM AND METHOD OF INTERACTING WITH DATA AT A WIRELESS COMMUNICATION DEVICE

(71) Applicant: AT&T INTELLECTUAL PROPERTY I, L.P., Atlanta, GA (US)

(72) Inventors: Zhi Li, Martinez, CA (US); Raghvendra Savoor, Walnut Creek, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/687,531

(22) Filed: Apr. 15, 2015

(65) Prior Publication Data

US 2015/0220560 A1 Aug. 6, 2015

Related U.S. Application Data

(62) Division of application No. 12/259,403, filed on Oct. 28, 2008, now Pat. No. 9,043,503.

(51) Int. Cl.
*G06F 17/30* (2006.01)
*G06F 3/0481* (2013.01)
(Continued)

(52) U.S. Cl.
CPC ...... *G06F 17/30194* (2013.01); *G06F 3/0481* (2013.01); *G06F 13/385* (2013.01);
(Continued)

(58) Field of Classification Search
CPC ............. G06F 17/30194; G06F 3/0481; G06F 13/385; G06F 2213/3814; H04W 4/70; H04W 88/02; G06Q 50/06
See application file for complete search history.

(56) References Cited

U.S. PATENT DOCUMENTS 4,727,537 A 2/1988 Nichols
5,485,634 A 1/1996 Weiser et al.
(Continued)

FOREIGN PATENT DOCUMENTS

WO WO 03/019403 * 5/2002 ............. G06F 15/16
WO 03019403 A2 3/2003

OTHER PUBLICATIONS

"Computers, Laptops, Servers, Printers & More," HP United States, Hewlett-Packard Development Company, L.P., http://welcome.hp.com/country/us/en/welcome.html, retrieved Jun. 16, 2008, 9 pages.
(Continued)

*Primary Examiner* — Eric T Oberly
(74) *Attorney, Agent, or Firm* — Toler Law Group, PC

(57) ABSTRACT

A wireless communication device includes a processor and a memory coupled to the processor. The memory includes instructions executable by the processor to perform operations. The operations include receiving a communication request input corresponding to an action to be executed with respect to a data file. The action is executable by the processor when the processor is connected to an external resource. The operations include automatically determining, in response to receiving the communication request input, whether the processor is connected to the external resource. The external resource enables the processor to communication via a wireless wide area network. The method also includes generating delayed action metadata in response to determining that the processor is not connected to the external resource. The delayed action metadata indicates that the requested action is to be executed by the processor when the processor is subsequently coupled to the external resource.

20 Claims, 12 Drawing Sheets

(51) Int. Cl.
  *G06F 13/38* (2006.01)
  *H04W 4/70* (2018.01)
  *H04W 88/02* (2009.01)
  *G06Q 50/06* (2012.01)
  *H04M 1/725* (2006.01)

(52) U.S. Cl.
  CPC ........ *G06Q 50/06* (2013.01); *H04M 1/72522* (2013.01); *H04W 4/70* (2018.02); *G06F 2213/3814* (2013.01); *H04M 1/72552* (2013.01); *H04W 88/02* (2013.01)

(56) References Cited

U.S. PATENT DOCUMENTS

| | | |
|---|---|---|
| 5,555,376 A | 9/1996 | Theimer et al. |
| 6,256,666 B1 | 7/2001 | Singhal |
| 6,553,240 B1 | 4/2003 | Dervarics |
| 6,701,378 B1 | 3/2004 | Gilhuly et al. |
| 6,705,781 B2 | 3/2004 | Iwazaki |
| 6,742,037 B1 | 5/2004 | Hall et al. |
| 7,006,242 B2 | 2/2006 | Smith, II et al. |
| 7,103,357 B2 | 9/2006 | Kirani et al. |
| 7,110,132 B2 | 9/2006 | Takayanagi |
| 7,272,407 B2 | 9/2007 | Strittmatter et al. |
| 7,333,227 B2 | 2/2008 | Seto |
| 7,363,582 B2 | 4/2008 | Sylthe et al. |
| 7,372,485 B1 | 5/2008 | Bodnar et al. |
| 8,145,222 B2 | 3/2012 | Wormald et al. |
| 2002/0028679 A1 | 3/2002 | Edwards et al. |
| 2002/0065939 A1 | 5/2002 | Liu |
| 2002/0083121 A1 | 6/2002 | Chang et al. |
| 2002/0113994 A1* | 8/2002 | Smith et al. .............. 358/1.15 |
| 2002/0138564 A1* | 9/2002 | Treptow ................ H04L 29/06 709/203 |
| 2003/0011805 A1* | 1/2003 | Yacoub ................ G06F 3/1204 358/1.15 |
| 2003/0035582 A1* | 2/2003 | Linhart ........................ 382/209 |
| 2003/0078965 A1* | 4/2003 | Cocotis .................. H04L 29/06 709/203 |
| 2004/0010567 A1* | 1/2004 | Moyer .................. G06F 3/1222 709/219 |
| 2004/0253981 A1 | 12/2004 | Blume et al. |
| 2005/0037787 A1* | 2/2005 | Bachner, III ........ H04L 67/1095 455/502 |
| 2005/0149481 A1 | 7/2005 | Hesselink et al. |
| 2006/0181730 A1 | 8/2006 | Moore |
| 2007/0035763 A1 | 2/2007 | Bard et al. |
| 2007/0066354 A1 | 3/2007 | Silverbrook et al. |
| 2007/0263246 A1* | 11/2007 | Bressan ................ G06F 3/1219 358/1.15 |
| 2008/0117449 A1 | 5/2008 | Lauridsen et al. |
| 2008/0225326 A1* | 9/2008 | Kephart ............ G06Q 30/0261 358/1.15 |
| 2009/0088188 A1* | 4/2009 | Wormald et al. ............. 455/466 |
| 2009/0307333 A1 | 12/2009 | Welingkar et al. |

OTHER PUBLICATIONS

"Easy Printing From Your Camera Phone," Hewlett-Packard Development Company, L.P., 2008, 2 pages.

Schenker, J.L., "Wireless: Your Cellphone Takes Pictures. Now What?" The International Herald Tribune, Jun. 28, 2004, 2 pages.

Wasserman, A., "Extending State Transition Diagrams for the Specification of Human-Computer Interaction," IEEE Transactions on Software Engineering, vol. SE-11, No. 8, Aug. 1985, pp. 699-713.

Weiser, M., "The Computer for the 21st Century," Scientific American Ubicomp Paper, http://www.ubiq.com/hypertext/weiser/SciAmDraft3.htm, retrieved Nov. 1, 2007, 9 pages.

* cited by examiner

US 10,140,311 B2

SYSTEM AND METHOD OF INTERACTING WITH DATA AT A WIRELESS COMMUNICATION DEVICE

PRIORITY CLAIM

This application claims priority from, and is a divisional of, U.S. patent application Ser. No. 12/259,403, filed on Oct. 28, 2008, which is incorporated herein by reference in its entirety.

FIELD OF THE DISCLOSURE

The present disclosure is generally related to systems and methods of interacting with data at a wireless communication device.

BACKGROUND

Wireless communication devices are able to receive, generate, and store a large variety of file types, such as video files, audio files, text files, and picture files. A user of a wireless communication device may want to execute an action with respect to a file at a particular time, but the wireless communication device may be incapable of executing the action at that time. For example, the wireless communication device may need to be connected to an external resource, such as a printer, to execute a requested print action. However, when a connection to the external resource becomes available, the user may not remember to execute the action.

DETAILED DESCRIPTION

Figure 1:
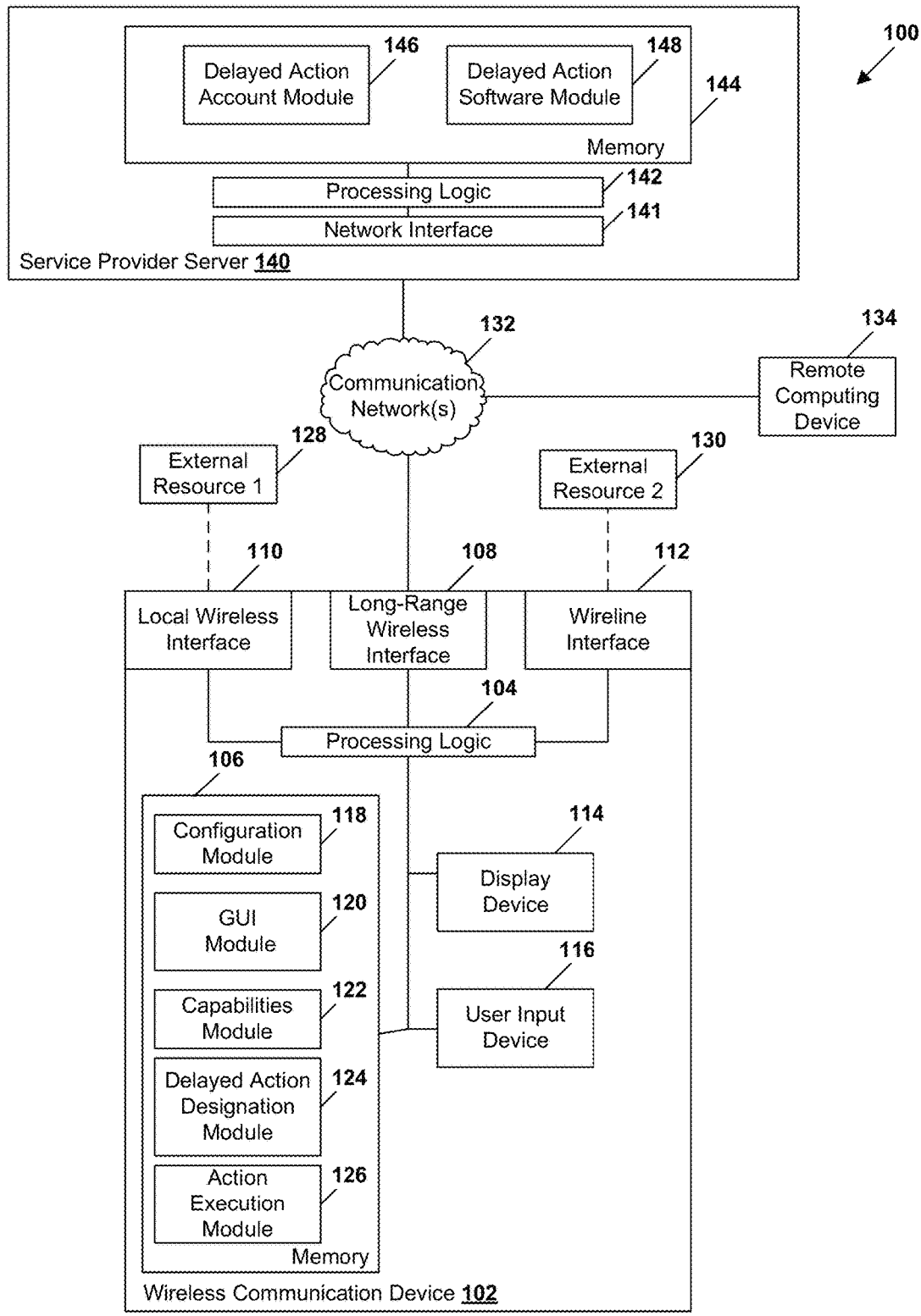
FIG. 1 is a block diagram of an embodiment of a system of interacting with data at a wireless communication device.

In one embodiment, a method of interacting with data at a wireless communication device is disclosed that includes receiving data at the wireless communication device via a wireless transmission, where the data represents visual content. The wireless communication device has access to a first set of capabilities. The method includes providing a first graphical user interface via a display device of the wireless communication device. The first graphical user interface includes a delayed action selector. The method also includes receiving an input at the delayed action selector of the first graphical user interface of the wireless communication device within a limited period of time after displaying the delayed action selector. The input is associated with a command to delay execution of an action with respect to the data received at the wireless communication device until the wireless communication device has access to a second set of capabilities. The action is not supported by the first set of capabilities but is supported by the second set of capabilities. The method also includes providing an indication of receipt of the input.

In another embodiment, a method is disclosed that includes receiving a first action input at a wireless communication device. The first action input indicates a first request to execute a first action with respect to data stored at the wireless communication device. The first action is executable via the wireless communication device while the wireless communication device is connected to a first external resource. The method also includes receiving a second action input at the wireless communication device. The second action input indicates a second request to execute a second action with respect to the data stored at the wireless communication device. The second action is executable via the wireless communication device while the wireless communication device is connected to a second external resource. The method includes generating first delayed action metadata in response to determining that the wireless communication device is not connected to the first external resource. The method also includes generating second delayed action metadata in response to determining that the wireless communication device is not connected to the second external resource. The method includes storing the first delayed action metadata and the second delayed action metadata at the wireless communication device. The method further includes determining when the wireless communication device is connected to the first external resource, the second external resource, or any combination thereof.

A wireless communication device is disclosed that includes a processor and a memory coupled to the processor. The wireless communication device also includes an action request module adapted to receive an action request input corresponding to an action to be executed with respect to data stored at the memory. The requested action is executable by the processor when the wireless communication device is connected to an external resource. Additionally, the wireless communication device includes a capabilities module adapted to automatically determine, in response to receiving the action request input, whether the wireless communication device is connected to the external resource. Further, the wireless communication device includes a delayed action designation module adapted to generate delayed action metadata in response to determining that the wireless communication device is not connected to the external resource. The delayed action metadata indicates that the requested action is to be executed by the processor when the wireless communication device subsequently is connected to the external resource.

In another embodiment, a system is disclosed that includes a delayed action account module adapted to receive a request to provide a delayed action feature to the wireless communication device. The wireless communication device includes a set of capabilities. The delayed action account module is further adapted to charge a fee to a subscriber account associated with the wireless communication device after adding the delayed action feature to the wireless communication device. In addition, the system includes a delayed action software module adapted to determine a set of capabilities of the wireless communication device and to select computer-executable instructions based at least partially on the set of capabilities of the wireless communication device. The delayed action software module is further adapted to send the computer-executable instructions to the wireless communication device.

In another embodiment, a computer-readable storage medium includes operational instructions that, when executed by a processor, cause the processor to receive and process an action request input at a wireless communication device. The action request input identifies a requested action to be executed with respect to data stored at the wireless communication device. The requested action is executable by the processor when the wireless communication device has access to a particular set of capabilities. Further, the computer-readable storage medium includes operational instructions that, when executed by the processor, cause the processor to automatically determine, in response to receiving the action request input, whether the wireless communication device has access to the particular set of capabilities. Further, the computer-readable storage medium includes operational instructions that, when executed by the processor, cause the processor to automatically generate delayed action metadata associated with the data in response to determining that the wireless communication device does not have access to the particular set of capabilities. Further, the computer-readable storage medium includes operational instructions that, when executed by the processor, cause the processor to monitor capabilities of the wireless communication device to determine when the wireless communication device has access to the particular set of capabilities. Further, the computer-readable storage medium includes operational instructions that, when executed by the processor, cause the processor to execute the requested action when the wireless communication device has access to the particular set of capabilities.

FIG. 1 is a block diagram of an embodiment of a system 100 of interacting with data at a wireless communication device. The system 100 includes a wireless communication device 102, such as a hand-held personal computing device, a smart phone, a mobile phone, or a laptop computer. The wireless communication device 102 includes processing logic 104, such as one or more independent or redundant microprocessors, and a memory 106. The wireless communication device 102 also includes a long-range wireless interface 108, a local wireless interface 110, and a wireline interface 112. The long-range wireless interface 108, the local wireless interface 110, and the wireline interface 112 may include software components, hardware components, or any combination thereof. In an illustrative, non-limiting embodiment, the long-range wireless interface 108 and the local wireless interface 110 may each include a respective transceiver and antenna. Additionally, the wireless communication device 102 includes a display device 114 and a user input device 116, such as a keypad, QWERTY keyboard, touch screen, other input devices, or any combination thereof. Further, the wireless communication device 102 may include other components not shown in FIG. 1. For example, the wireless communication device 102 may include a power supply, such as a battery, one or more speakers, a microphone, or any combination thereof.

The wireless communication device 102 is adapted to communicate with one or more communication networks 132 via the long-range wireless interface 108. In an illustrative embodiment, the one or more communication networks 132 include a wide area wireless communication network, a public switched telephone network (PSTN), an Internet Protocol network, a cable television network, a satellite communication network, or any combination thereof. In an illustrative, non-limiting embodiment, the one or more communication networks 132 may include a wide area wireless communication network that is associated with a wireless communications service provider that provides wireless voice services, wireless data services, or any combination thereof, to the wireless communication device 102. The wireless communication device 102 may communicate with a remote computing device 134, a service provider server 140, or any combination thereof, via the one or more communication networks 132. The remote computing device 134 may include an additional wireless communication device, a personal computer, a laptop computer, a third-party server, or any combination thereof.

The wireless communication device 102 is adapted to communicate with a first external resource 128 via the local wireless interface 110. The local wireless interface 110 may include an infra-red (IR) wireless interface, a Bluetooth wireless interface, an IEEE 802.11 protocol related interface, or any combination thereof. Additionally, the wireless communication device 102 is adapted to communicate with a second external resource 130 via the wireline interface 112. The wireline interface 112 may include a local area network (LAN) Ethernet interface, a universal serial bus (USB) interface, another type of wireline interface to the second external resource 130, such as a Recommended Standard (RS) 232 interface, or any combination thereof. The first external resource 128 and the second external resource 130 may include a printer, a fax machine, a scanner, an external hard drive, a compact disc (CD) device, a digital video disc (DVD) device, a desktop computer, a server, an additional wireless communication device, or any combination thereof. Although one first external resource 128 and one second external resource 130 are shown in FIG. 1, the local wireless interface 110 and the wireline interface 112 may each be coupled to multiple external resources. Further, the wireless communication device 102 may be adapted to communicate with another external resource through the long-range wireless interface 108 via the one or more communication networks 132.

The wireless communication device 102 may be coupled to the second external resource 130 via a docking station (not shown). The docking station may be adapted to facilitate communication between the wireless communication device 102 and the second external resource 130. For example, the docking station may be adapted to facilitate synchronizing files between the wireless communication device 102 and the second external resource 130 or to facilitate the execution of actions associated with files stored at the wireless communication device 102.

In one embodiment, during operation, the wireless communication device 102 receives data (e.g., one or more data items) via the one or more communication networks 132. The data may include a text-related file, such as an email or text message, an electronic document (e.g., word processing, presentation, spreadsheet, drawing, graphics, web page or other hypertext, or extensible markup language (XML) document), a video file, an audio file, a picture file, or an executable file or script. A user of the wireless communication device 102 may want to execute an action with respect to the received data. To illustrate, the user of the wireless communication device 102 may want to print an email or picture, record a video file to a DVD, or record an audio file to a CD. The user may realize, however, that the wireless communication device 102 is not connected to an external resource adapted to execute the desired action at the time that the data is received. For example, the user may be driving a car, walking down the street, or in a restaurant. The user may utilize features of the wireless communication device 102 to mark the received data such that the desired action will be executed when the wireless communication device 102 has access to the external resource. In an example, actions marked for delayed execution may be executed when the wireless communication device 102 is being synchronized with a desktop computer, where the desktop computer is associated with resources adapted to execute the delayed actions. To illustrate, a printing action can be executed via a printer connected to the desktop computer, a video file can be saved to an external hard drive connected to the desktop computer, and a picture file can be recorded on a CD by a CD device associated with the desktop computer. In another example, the wireless communication device 102 may connect individually to each resource that is adapted to execute actions associated with marked data items.

In another embodiment, during operation, the wireless communication device 102 may automatically determine whether or not the wireless communication device 102 is connected to the external resource when the user enters an input to execute a desired action and automatically mark the data item when the external resource is not available. Further, data items that are generated via an application of the wireless communication device, such as a text editing application or a video filming application, may be marked for delayed execution.

The memory 106 includes a configuration module 118, a graphical user interface (GUI) module 120, a capabilities module 122, a delayed action designation module 124, and an action execution module 126. Additionally, the memory 106 may include a data store (not shown) that stores data associated with the wireless communication device 102, such as contact information, call logs, calendar information, data transmission and reception histories, ring tone and sound settings information, audio files, picture files, video files, text-related files, such as emails and short message service (SMS) messages, or any combination thereof. In one embodiment, each of the modules 118-126 can represent instructions that are executable by the processing logic 104, such as instructions embodied in one or more software programs stored at the memory 106. In another embodiment, the modules 118-126 can represent hardware, software instructions, or any combination thereof.

The configuration module 118 is adapted to retrieve and store configuration data associated with the wireless communication device 102. In an illustrative embodiment, the wireless communication device 102 may include default configuration information that is stored on the wireless communication device 102 before activation. Additionally, the configuration information may be provided to the wireless communication device 102 from the service provider server 140 during a configuration mode when the wireless communication device 102 is first activated, via an automatic update from the service provider server 140, or any combination thereof. Further, the configuration module 118 may be adapted to send a request to the service provider server 140, the remote computing device 134, or any combination thereof, related to retrieving configuration information.

The configuration data may include data type information indicating that a particular set of actions is executable with respect to a particular type of data stored at the wireless communication device 102. For example, each type of data that can be stored at the wireless communication device 102, such as a video file, a picture file, an audio file, website content, or a text-related file, may be associated with corresponding data type information indicating a particular set of actions that can be executed with respect to that type of data. To illustrate, the data type information may indicate that a text file may be saved at the wireless communication device 102, deleted, printed, faxed, scanned, sent to a destination device, such as the remote computing device 134, or any combination thereof. In another illustration, the data type information may indicate that a picture file may be saved at the wireless communication device 102, saved at an external hard drive, printed, recorded on a compact disc, deleted, sent to a destination device, or any combination thereof. The data type information may also indicate that one or more actions executable with respect to a particular type of file may be delayed until the wireless communication device 102 has access to the capabilities required to perform the one or more actions. For example, the data type information may indicate that a request to print a picture file that occurs when the wireless communication device 102 is not connected to a printer can be delayed until the wireless communication device 102 has made a connection with the printer.

In addition, the configuration data may include action capability information indicating that each particular action that is executable via the wireless communication device 102 is associated with a respective set of capabilities. For example, the action capability information associated with a particular action may indicate that the particular action can be executed when the wireless communication device 102 is connected to a specified external resource, when a specified amount of random access memory (RAM) is available at the wireless communication device 102, when a specified data rate is available via the long-range wireless interface 108, when a specified amount of memory is available at a data store of the wireless communication device 102, when the wireless communication device 102 is connected to a specified virtual private network (VPN) (e.g., via the wireline interface 112), or any combination thereof. To illustrate, the configuration module 118 may include action capability information indicating that a record to DVD action is executable with respect to particular data stored at the wireless communication device 102 when the wireless communication device 102 is connected to a DVD device.

The action capability information may identify certain resources to execute a particular action. For example, the action capability information may identify one or more printers, such as a printer located at a home or workplace of a user of the wireless communication device 102 to perform a requested print action. The action capability information may also include a prioritized list of resources associated with a particular action. In an illustrative embodiment, the action capability information may indicate a preferred resource to execute a particular type of action and one or more additional resources that may be invoked to execute the particular action. In an example, the action capability information may indicate that the one or more additional resources are to be invoked to execute a requested action when a connection to the one or more additional resources is available and a connection to the preferred resource has not been available for a specified amount of time after the request to execute the action has been made. To illustrate, the prioritized list may indicate that a video file stored at the wireless communication device 102 is preferably recorded via a DVD device located at the home of a wireless communication device 102 user, but when the wireless communication device 102 is not able to connect to the preferred DVD device after an hour, the video file may be recorded via a DVD device located at the work location of the wireless communication device 102 user if a connection to the additional resource becomes available. In another example, the one or more additional resources may be invoked with respect to a particular action when a preferred resource is busy performing another requested action.

Further, the action capability information may identify a respective set of capabilities related to each type of data associated with a particular action. For example, printing an email or SMS message may be associated with different capabilities than printing a picture. To illustrate, the action capability information may indicate that an action related to printing a photograph is to be executed by a printer that is configured to print color photographs, while an action related to printing an email can be executed on a printer without a color photograph printing feature.

The action capability information may include user selected action capability information. For example, a user of the wireless communication device 102 may select one or more resources to execute a particular action, such as one or more external hard drives to execute a save to external hard drive action. The action capability information may also include default action capability information provided by the manufacturer of the wireless communication device 102, a wireless communications service provider associated with the wireless communication device 102, or any combination thereof. The action capability information may also include additional action capability information received from an additional source. In an example, the additional action capability information may include information provided by an external resource manufacturer indicating that a particular resource has certain features. To illustrate, the additional action capability information may be provided by a printer manufacturer indicating that a particular printer is adapted to communicate via a Bluetooth interface and includes a feature that allows the printing of color photographs.

The configuration module 118 may also include configuration data related to a current set of capabilities associated with the wireless communication device 102 (e.g., a set of capabilities at the time of a requested action). For example, the configuration data related to the current set of capabilities may indicate that the wireless communication device 102 is connected to one or more external resources. Additionally, the configuration data related to the current set of capabilities may indicate software, hardware, or any combination thereof, included in the wireless communication device 102. To illustrate, the configuration data related to the current set of capabilities may indicate that the wireless communication device 102 includes an IEEE 802.11 interface and a USB port. In another illustration, the configuration data related to the current set of capabilities may indicate that the wireless communication device 102 is enabled to communicate via a wireless broadband connection and that the wireless communication device 102 is connected to a desktop computer. Alternatively, the configuration data related to the current set of capabilities may indicate that the wireless communication device 102 is enabled to communicate via a wireline interface or via a long-range wireless broadband connection. For example, the long-range wireless broadband connection may include a Worldwide Operability for Microwave Access (WiMAX) connection or a Long Term Evolution (LTE) connection.

The graphical user interface (GUI) module 120 may be adapted to provide one or more graphical user interfaces via the display device 114. The one or more graphical user interfaces may be associated with providing wireless call services, wireless data services, or any combination thereof, via the wireless communication device 102. The one or more graphical user interfaces may be adapted to provide selectable options via a touch screen provided on the display device 114, via selections of icons using the user input device 116, or any combination thereof. Examples of graphical user interfaces provided by the GUI module 120 are illustrated in FIGS. 4-11.

In a particular embodiment, the GUI module 120 may be adapted to provide graphical user interfaces associated with configuring the wireless communication device 102. For example, the GUI module 120 may be adapted to provide one or more graphical user interfaces related to selecting the capabilities needed to execute specified actions via the wireless communication device 102. To illustrate, the GUI module 120 may be adapted to provide a graphical user interface associated with selecting one or more resources to execute a particular action, such as selecting one or more CD devices to execute a record on CD action. In another example, the GUI module 120 may be adapted to provide graphical user interfaces related to selecting actions that may be executed with respect to a particular type of data, such as a video file, a picture file, or a text-related file.

In a particular embodiment, the GUI module 120 is adapted to provide at least one graphical user interface associated with selecting one or more actions to be executed with respect to particular data stored at the wireless communication device 102. For example, the GUI module 120 may be adapted to provide a graphical user interface associated with a picture file, where the graphical user interface includes selectable icons related to printing the picture file, saving the picture file, deleting the picture file, recording the picture file on a CD, saving the picture file to an external hard drive, or any combination thereof. Each of the actions selectable with respect to each data type may be associated with a specified set of capabilities that are needed to execute the respective action. The GUI module 120 may be adapted to provide the action selection graphical user interfaces in response to an action triggering event. For example, the GUI module 120 may be adapted to provide the action selection graphical user interfaces in response to receiving particular data at the wireless communication device 102. To illustrate, the wireless communication device 102 may receive a video file from the remote computing device 134 and the GUI module 120 may be adapted to provide an action selection graphical user interface upon receiving the video file, where the graphical user interface includes a number of selectable icons related to actions that can be executed with respect to the video file.

Additionally, the GUI module 120 may be adapted to provide an action selection graphical user interface in response to a selection of particular data (e.g. a data item) from a list of data items stored at the wireless communication device 102. Further, the GUI module 120 may be adapted to provide an action selection graphical user interface in response to the execution of an application of the wireless communication device, where execution of the application generates data that is associated with a new data item. In an example, the GUI module 120 may be adapted to provide an action selection graphical user interface after a picture has been taken via the wireless communication device 102 or during the composition of an email via the wireless communication device 102.

In an illustrative embodiment, the GUI module 120 is adapted to provide one or more graphical user interfaces when the wireless communication device 102 does not have access to a specified set of capabilities that is adapted to execute a selected action with respect to particular data. For example, the wireless communication device 102 may be incapable of sending a video file via a broadband connection upon selection of a send via broadband action via a graphical user interface. The one or more graphical user interfaces may include at least one graphical user interface that includes a delayed action selector. The delayed action selector is adapted to receive an input from a user within a limited period of time after displaying the delayed action selector. The input may be associated with a command to delay execution of an action with respect to the data received at the wireless communication device until the wireless communication device has access to a second set of capabilities. The user requested action is not supported by the first set of capabilities but is supported by the second set of capabilities. The one or more graphical user interfaces may also be adapted to provide an indication of receipt of the input at the delayed action selector. For example, the indication of receipt may be provided by an updated view of a first graphical user interface. Alternatively, the indication of receipt may be provided by a second graphical user interface that includes a delayed action designation icon. The delayed action designation icon indicates that the action is to be executed when the wireless communication device 102 supports the second set of capabilities. In one embodiment, the particular data item includes the delayed action designation icon, indicating that the execution of the requested action is to be delayed until the wireless communication device 102 has access to the second set of capabilities. For example, the delayed action designation icon may include a print icon, a fax icon, an email icon, a save icon, a record icon, an upload icon, a download icon, or any combination thereof. In one embodiment, when the wireless communication device 102 subsequently has access to the specified set of capabilities, the delayed action designation icon is replaced with an executed action icon. The executed action icon indicates that the requested action has been executed.

Additionally, the GUI module 120 may be adapted to provide a graphical user interface indicating that the wireless communication device 102 requires additional hardware, additional software, or any combination thereof, to execute one or more requested actions. Further, when the wireless communication device 102 subsequently has access to the specified set of capabilities, the GUI module 120 may be adapted to provide a graphical user interface indicating that the wireless communication device 102 is capable of executing the requested action and that includes a first selectable option related to proceeding with the requested action and a second selectable option related to canceling the requested action.

The memory 106 also includes a capabilities module 122 that is adapted to determine whether the wireless communication device 102 has access to a specified set of capabilities that is adapted to perform a requested action. The capabilities module 122 may be adapted to compare the current set of capabilities associated with the wireless communication device 102 to the specified set of capabilities adapted to execute the requested action. The capabilities module 122 may be adapted to compile data received via the long-range wireless interface 108, the local wireless interface 110, the wireline interface 112, or any combination thereof, and configuration data associated with hardware components, software components, or any combination thereof, stored at the wireless communication device 102 to determine the current set of capabilities of the wireless communication device 102. The capabilities module 122 may also be adapted to communicate with the service provider server 140, the remote computing device 134, or any combination thereof, to determine whether the wireless communication device 102 has access to the specified set of capabilities. For example, the wireless communication device 102 may become connected to a particular external resource, such as a printer, and the wireless communication device 102 may communicate with the service provider server 140, the remote computing device 134, or any combination thereof, to determine whether the external resource is adapted to execute a requested action. When the wireless communication device 102 has access to the specified set of capabilities adapted to execute a requested action, the capabilities module 122 may be adapted to invoke the action execution module 126 to execute the requested action.

When the wireless communication device 102 is not configured to execute a requested action, the capabilities module 122 may be adapted to monitor the capabilities of the wireless communication device 102 to determine when the wireless communication device 102 is capable of executing the requested action. For example, the capabilities module 122 may be adapted to transmit wireless resource identification signals via the long-range wireless interface 108, the local wireless interface 110, or any combination thereof, to identify resources that are adapted to communicate with the wireless communication device 102, such as the first external resource 128 and the second external resource 130. The capabilities module 122 may be adapted to periodically or continuously transmit the wireless resource identification signals. The wireless resource identification signals may be related to one or more resources required to execute a particular action. For example, if the wireless communication device 102 needs to connect to a printer before printing particular data, the wireless resource identification signals may include data that is formatted according to a particular protocol that is associated with the printer. In another example, the wireless resource identification signals may include information specific to a particular printer, such as a printer located at the home of a user of the wireless communication device 102, that has been designated to execute print actions associated with the wireless communication device 102.

The capabilities module 122 may be adapted to invoke the delayed action designation module 124 when the wireless communication device 102 does not have access to a specified set of capabilities required to execute a requested action. For example, the wireless communication device 102 may have access to a first set of capabilities. The requested action may be unsupported by the first set of capabilities. However, the requested action may be supported by a second set of capabilities. For example, the second set of capabilities may include access to an external resource, an internal device capability of the wireless communication device 102, or a capability to output visual content. The delayed action designation module 124 allows a user to delay execution of the requested action until the wireless communication device 102 has access to the second set of capabilities that support the requested action.

In a particular embodiment, the second set of capabilities includes access to at least one external resource to perform the requested action. The at least one external resource may be inaccessible with the first set of capabilities. For example, the at least one external resource may include a printer, a fax machine, an external hard drive, a compact disc (CD) device, a digital video disc (DVD) device, a broadband data connection, or any combination thereof. The delayed action designation module 124 allows the user to delay execution of the requested action until the wireless communication device 102 has access to the at least one external resource. When the wireless communication device 102 has access to the at least one external resource, the wireless communication device 102 has the capability to print, fax, email, save, record, upload, download, or any combination thereof.

In another particular embodiment, the second set of capabilities includes capabilities to output the visual content. For example, the wireless communication device 102 may include a hand-held wireless communication device. The second set of capabilities may include capabilities to display the visual content at the hand-held communication device. The delayed action designation module 124 allows the user to delay execution of the requested action until the wireless communication device 102 has access to the capability to output the visual content.

In another particular embodiment, the second set of capabilities includes an internal device capability at the wireless communication device 102. For example, the internal device capability may include one or more device drivers associated with one or more external resources. The delayed action designation module 124 allows the user to delay execution of the requested action until the wireless communication device 102 has access to the internal device capability to perform the requested action. For example, a particular printer driver may be used to print to a particular printer. The delayed action designation module 124 allows the user to delay execution of a requested print action associated with the particular printer until the wireless communication device 102 later obtains access to the particular printer driver. As another example, a particular multimedia reader may be used to display a particular image or multimedia file. The delayed action designation module 124 allows the user to delay execution of a requested display action associated with the particular image or multimedia file until the wireless communication device 102 later obtains access to the particular multimedia reader.

Further, the capabilities module 122 may be adapted to send a request to download software from the service provider server 140, the remote computing device 134, or any combination thereof, where the software is associated with the second set of capabilities. In one embodiment, the capabilities module 122 receives additional software in response to determining that the wireless communication device 102 does not support the second set of capabilities. For example, the additional software may include one or more device drivers associated with one or more external resources.

After the capabilities module 122 has started monitoring for a specified set of capabilities, the capabilities module 122 may be adapted to analyze information received via the long-range wireless interface 110, the local wireless interface 108, or any combination thereof, in response to sending the wireless resource identification signals to determine when the wireless communication device 102 has access to the specified set of capabilities required to execute a requested action. Additionally, the capabilities module 122 may be adapted to analyze data received via the wireline interface 112, to analyze configuration data stored at the wireless communication device 102, or any combination thereof, to determine when the wireless communication device 102 has access to the specified set of capabilities required to execute a requested action. In response to determining that the wireless communication device 102 has access to the specified set of capabilities based on data received during the monitoring process, the capabilities module 122 may be adapted to invoke the action execution module 126. For example, the capabilities module 122 may be adapted to invoke the action execution module 126 to establish a connection with a particular resource associated with the specified set of capabilities after receiving data indicating that a connection with the particular resource is available. To illustrate, the capabilities module 122 may be monitoring for a broadband data connection in order to send a video file stored at the wireless communication device 102. After the capabilities module 122 receives data via the local wireless interface 110 indicating that the wireless communication device 102 can establish a connection with a desktop computer that has access to a broadband data connection, the capabilities module 122 may invoke the action execution module 126 to establish a connection with the desktop computer and execute the action of sending the video file via the broadband data connection. In another illustration, the capabilities module 122 may determine that the wireless communication device 102 can communicate at a specified data rate via the long-range wireless interface 108 and send a video file at that time.

The delayed action designation module 124 is adapted to generate delayed action metadata stored at the wireless communication device 102 in response to determining that the wireless communication device 102 does not have access to the set of capabilities that is adapted to execute a requested action. For example, the wireless communication device 102 may be unconnected to (or disconnected from) an external resource, such as external resources 128 and 130. The delayed action metadata indicates that the requested action is to be executed by the processing logic 104 when the wireless communication device is subsequently connected to the external resource. Alternatively, the wireless communication device 102 may not have access to an internal device capability. For example, the wireless communication device 102 may not have access to one or more device drivers associated with one or more external resources. The delayed action metadata indicates that the requested action is to be executed when the wireless communication device has access to the internal device capability, such as one or more device drivers.

The delayed action designation module 124 may be adapted to mark particular data by automatically generating metadata associated with the particular data without user input in response to determining that the wireless communication device does not have access to the required set of capabilities. The delayed action metadata may identify the requested action and the set of capabilities that is required to execute the requested action. Alternatively, the delayed action designation module 124 may be adapted to generate the delayed action metadata in response to receiving an input at a delayed action selector of a graphical user interface provided by the wireless communication device 102, via the user input device 116. The input received at the delayed action selector may be received within a limited period of time after displaying the delayed action selector. For example, the limited period of time may be ten minutes, five minutes, one minute, or any other limited period of time. The limited period of time for receiving the input from the user allows the user an opportunity to mark the data for delayed execution in order to avoid forgetting to perform the action at a later time (e.g., when the wireless communication device 102 is capable of executing the requested action). The input may be associated with a command to delay execution of the requested action until the wireless communication device 102 has access to the required set of capabilities associated with the requested action. Further, the delayed action metadata may indicate that a requested action is to be delayed for a particular amount of time. For example, a user of the wireless communication device 102 may set a timer indicating that execution of a requested action is to be delayed a specified amount of time or until a particular time.

The delayed action designation module 124 may also be adapted to place data associated with requested actions into a number of queues. The delayed action designation module 124 may be adapted to associate data with a respective queue based on delayed action metadata associated with the data. Additionally, the delayed action designation module 124 may be adapted to include delayed action metadata associated with a respective data item in a particular queue. In an illustrative, non-limiting embodiment, the delayed action designation module 124 is adapted to store a pointer to a particular data item in one or more of the queues. In an alternative embodiment, the wireless communication device 102 includes a data manager adapted to allocate a portion of the memory 106 and to store the data and delayed action metadata in the allocated portion of the memory. In a particular embodiment, the delayed action metadata associated with the data includes a pointer and the data manager is adapted to store the pointer in a file including additional pointers, where each of the additional pointers is related to other delayed action metadata. Thus, the pointers may be used to reference locations of delayed action metadata stored in the memory 106.

In one embodiment, each queue is associated with a particular type of action. For example, a first queue may include data associated with requested actions related to printing data (e.g. a first external resource) and a second queue may include data associated with requested actions related to recording data on a DVD (e.g. a second external resource). In some embodiments, the first queue may include media recording on CD actions associated with data of different types, such as picture files and text-related files and the print actions may be executed via the same printer or a different printer. In another embodiment, each queue is associated with a particular set of capabilities. To illustrate, the delayed action designation module 124 may be adapted to place record on CD actions associated with a CD device located in the home of a user of the wireless communication device 102 into a first queue and to place record on CD actions associated with a CD device located in the workplace of the user of the wireless communication device 102 into a second queue.

Delayed action metadata generated by the delayed action designation module 124 with respect to a requested action may be used by the capabilities module 122 in determining when the wireless communication device 102 has access to a specified set of capabilities adapted to execute the requested action. For example, when the capabilities associated with the wireless communication device 102 change, the capabilities module 122 retrieves delayed action metadata associated with data stored at the wireless communication device 102 to determine whether the wireless communication device 102 is capable of executing a delayed action with respect to one or more data items.

In an alternative to placing data identifying requested actions into queues, the delayed action designation module 124 may be adapted to create or update a file that includes data identifying each of the requested actions. The data identifying each of the requested actions may be ordered within the designated file in some manner, for example, in chronological order, with respect to data type, with respect to the set of capabilities required to execute a particular requested action, or any combination thereof.

In a particular embodiment, the action execution module 126 is adapted to execute actions requested via the wireless communication device 102. The action execution module 126 may be adapted to execute a requested action when the current capabilities associated with the wireless communication device 102 include a specified set of capabilities required to execute the requested action. In an illustrative embodiment, the action execution module 126 may be adapted to receive a signal from the capabilities module 122 to establish a connection with a particular resource associated with the specified set of capabilities when a connection between the wireless communication device 102 and the particular resource is available. In an illustrative, non-limiting embodiment, the action execution module 126 may be adapted to execute one or more delayed actions upon synchronization with another computing device, such as a desktop computer at the home of a user of the wireless communication device 102.

When the wireless communication device 102 has access to the specified set of capabilities, the action execution module 126 may be adapted to execute requested actions by reading data associated the requested actions from one or more queues. In an illustrative embodiment, the action execution module 126 is adapted to search for delayed action metadata when the capabilities associated with the wireless communication device 102 have changed to determine whether the current capabilities of the wireless communication device 102 match the capabilities adapted to execute the actions identified by the delayed action metadata. The order that the action execution module 126 executes the actions may be determined based on the order of the particular actions within a queue. In an illustrative, non-limiting embodiment, one or more requested actions may be associated with a high priority designation. The action execution module 126 may be adapted to execute high priority actions before other actions.

Further, the action execution module 126 may be adapted to scan data related to each of the data items stored at the wireless communication device 102 to identify data items that are associated with delayed action metadata identifying a delayed action. In one embodiment, the action execution module 126 may be adapted to read from a designated file that includes data associated with all of the delayed requested actions and execute particular actions from the designated file when the wireless communication device 102 has access to a specified set of capabilities.

The service provider server 140 includes a network interface 141 to communicate with one or more wireless communication devices via the communication network 132. The service provider server 140 also includes processing logic 142, such as one or more independent or redundant microprocessors, and a memory 144. The memory 144 includes a delayed action account module 146 and a delayed action software module 148. In one embodiment, each of the modules 146-148 can represent instructions that are executable by the processing logic 142, such as instructions embodied in one or more software programs stored at the memory 144. In another embodiment, the modules 146-148 can represent hardware, software instructions, or any combination thereof.

The delayed action account module 146 may be adapted to receive a request associated with a subscriber account related to the wireless communication device 102. The request is related to providing a delayed action feature to the subscriber account. The subscriber account may be related to one or more additional wireless communication devices and the delayed action feature may be implemented on each of the wireless communication devices associated with the subscriber account. The delayed action account module 146 may be adapted to charge a fee to the subscriber account after adding the delayed action feature to the subscriber account. The delayed action account module 146 may be adapted to charge a periodic fee to the subscriber account, such as on a monthly basis, for the delayed action feature or to charge a one-time fee to the subscriber account for the delayed action feature.

The delayed action software module 148 may be adapted to send computer-executable instructions to the wireless communication device 102. The computer-executable instructions may include a default configuration file that identifies a plurality of sets of actions that may be executed with respect to data stored at the wireless communication device 102. The default configuration file may identify that each of the plurality of sets of actions is associated with a respective type of data. Additionally, the default configuration file may identify that each of the plurality of sets of actions is associated with a respective set of capabilities adapted to execute the particular set of actions. The default configuration file may be stored at the configuration module 118 of the wireless communication device 102.

The computer-executable instructions may also include a delayed action metadata module that is adapted to generate delayed action metadata associated with particular data. The delayed action metadata may identify one or more actions to be executed with respect to the particular data and that the execution of the one or more actions is to be delayed. Additionally, the delayed action metadata may identify at least one set of capabilities that is adapted to execute each respective action. The delayed action metadata module may be included with the delayed action designation module 124 stored at the wireless communication device 102. The computer-executable instructions may also be associated with a capabilities module adapted to determine a current set of capabilities associated with the wireless communication device 102 and to determine when the current set of capabilities associated with the wireless communication device 102 includes a specified set of capabilities that is adapted to execute a delayed action. The capabilities module may be included with the capabilities module 122 of the wireless communication device 102. Further, the computer-executable instructions may include other features needed to mark data stored at wireless communication device 102 with respect to a delayed action and to subsequently execute the delayed action.

The delayed action software module 148 may be adapted to send the computer-executable instructions to the wireless communication device 102 in response to adding the delayed action feature to a subscriber account associated with the wireless communication device 102. Additionally, the delayed action software module 148 may be adapted to send periodic software updates to the wireless communication device 102.

In an illustrative embodiment, the delayed action software module 148 may be adapted to identify hardware, software, or any combination thereof, associated with the wireless communication device 102 and send computer-executable instructions to the wireless communication device 102 based on the identified hardware, software, or any combination thereof. For example, the delayed action software module 148 may be adapted to identify that the wireless communication device 102 includes a Bluetooth interface. The delayed action software module 148 may subsequently send computer-executable instructions to the wireless communication device 102 that is related to Bluetooth enabled external resources.

Figure 2:
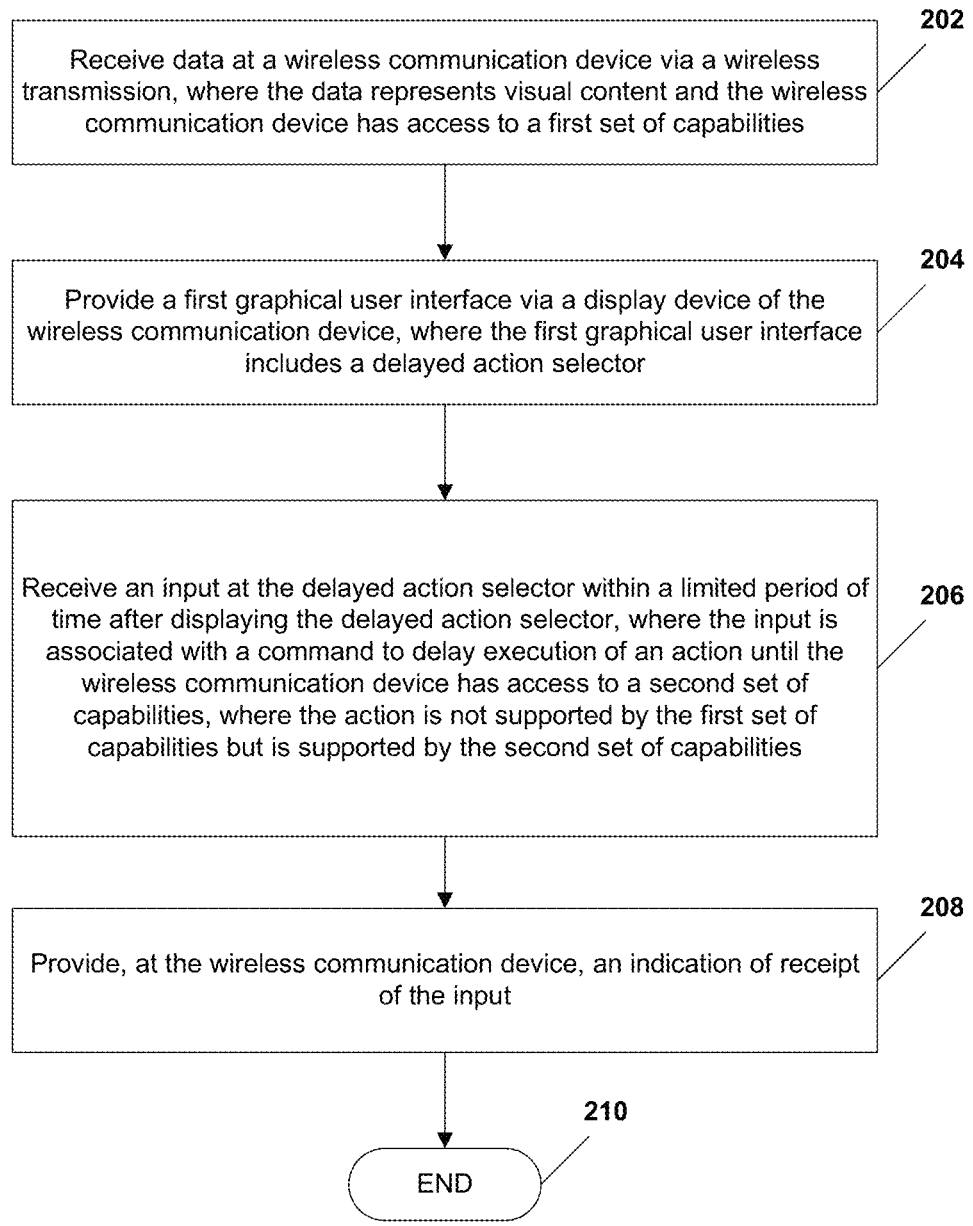
FIG. 2 is a flow diagram of an embodiment of a method of interacting with data at a wireless communication device.

FIG. 2 is a flow diagram of an embodiment of a method of interacting with data at a wireless communication device, such as the wireless communication device 102 illustrated in FIG. 1. Data is received at the wireless communication device via a wireless transmission, at 202. The data represents visual content. The wireless communication device has access to a first set of capabilities. The data may include a particular data item or a particular type of data item, such as a picture file, a video file, or a text-related file. For example, the data may be received at the wireless communication device from a remote computing device via a wireless communication network. Further, the data may be generated by an application executed at the wireless communication device. For example, the data may be generated by executing a text editor application to compose an email or text message or executing a camera application to take a picture or film a video.

In a particular embodiment, the method further includes determining whether the wireless communication device supports a second set of capabilities. The wireless communication device may include a current set of capabilities associated with the wireless communication device (e.g. the first set of capabilities) but may not include the specified set of capabilities adapted to execute the requested action (e.g. the second set of capabilities). Thus, the wireless communication device may be incapable of executing the requested action at the time of the request. As an example, the wireless communication device may determine that a request to record a picture file stored at the wireless communication device on a storage device cannot be executed because the wireless communication device is not connected to the storage device. As another example, the wireless communication device may be incapable of executing a request to print, fax, email, save, record, upload, or download a particular file or data object at the time of request.

Proceeding to 204, a first graphical user interface is provided via a display device of the wireless communication device. The first graphical user interface includes a delayed action selector. At 206, an input is received at the delayed action selector of the first graphical user interface of the wireless communication device within a limited period of time after displaying the delayed action selector. In a particular embodiment, the limited period of time is ten minutes. Alternatively, the limited period of time may be five minutes, one minute, or any other limited period of time. The limited period of time for receiving the input from the user allows the user an opportunity to mark the data for delayed execution in order to avoid forgetting to perform the action at a later time (e.g., when the wireless communication device 102 is capable of executing the requested action). The input received at the delayed action selector is associated with a command to delay execution of an action with respect to the data received at the wireless communication device until the wireless communication device has access to a second set of capabilities. The action is not supported by the first set of capabilities but the requested action is supported by the second set of capabilities. For example, the input may be an input received via a touch screen, graphical user interface, or keypad related to recording a video file stored at the wireless communication device on a DVD. The requested action may be executed when the wireless communication device has access to a specified set of capabilities, but not when the wireless communication device has access to a different set of capabilities. For example, when the wireless communication device does not have access to a DVD device, the video file cannot be recorded to the DVD device. When the wireless communication device later obtains access to the DVD device, the requested action of recording the video file to the DVD device may then be automatically executed.

Proceeding to 208, the method includes providing, at the wireless communication device, an indication of receipt of the input. For example, the indication of receipt may be provided by an updated view of the first graphical user interface. Alternatively, the indication of receipt may be provided by a second graphical user interface that includes a delayed action designation icon. The delayed action designation icon indicates that the action is to be executed when the wireless communication device later detects the second set of capabilities. For example, the delayed action designation icon may include a print icon, a fax icon, an email icon, a save icon, a record icon, an upload icon, a download icon, or any combination thereof. In a particular embodiment, when the requested action has been executed, the delayed action designation icon is replaced with an executed action icon. For example, the print icon may be replaced with the executed action icon when a requested print action has been executed.

In one embodiment, the wireless communication device generates and stores delayed action metadata associated with the particular data. The delayed action metadata identifies the requested action, the specified set of capabilities that is adapted to execute the requested action, and whether the execution of the requested action is to be delayed. The delayed action metadata may be generated in response to receiving the input at the delayed action selector of the first graphical user interface of the wireless communication device.

In one embodiment, the wireless communication device monitors a current set of capabilities associated with the wireless communication device to determine when the current set of capabilities includes the specified set of capabilities adapted to execute the requested action. For example, the wireless communication device may monitor connections to external resources, data transmission capability, random access memory capacity, or another aspect of the wireless communication device that is associated with executing the requested action.

In one embodiment, the wireless communication device may provide an indication that the wireless communication device supports the second set of capabilities. In a particular embodiment, the indication includes a visual indication or an audio indication. The visual or audio indication may alert a user of the wireless communication device that the previously requested action is capable of being executed. In a particular embodiment, a second graphical user interface is provided that indicates that the wireless communication device is capable of executing the requested action. The second graphical user interface includes a first selectable option to proceed with execution of the previously requested action and a second selectable option to cancel execution of the previously requested action. In an alternative embodiment, the wireless communication device executes the requested action automatically in response to determining that a current set of capabilities associated with the wireless communication device includes the specified set of capabilities. To illustrate, the wireless communication device may automatically execute a print action upon establishing a connection with a printer.

Figure 3:
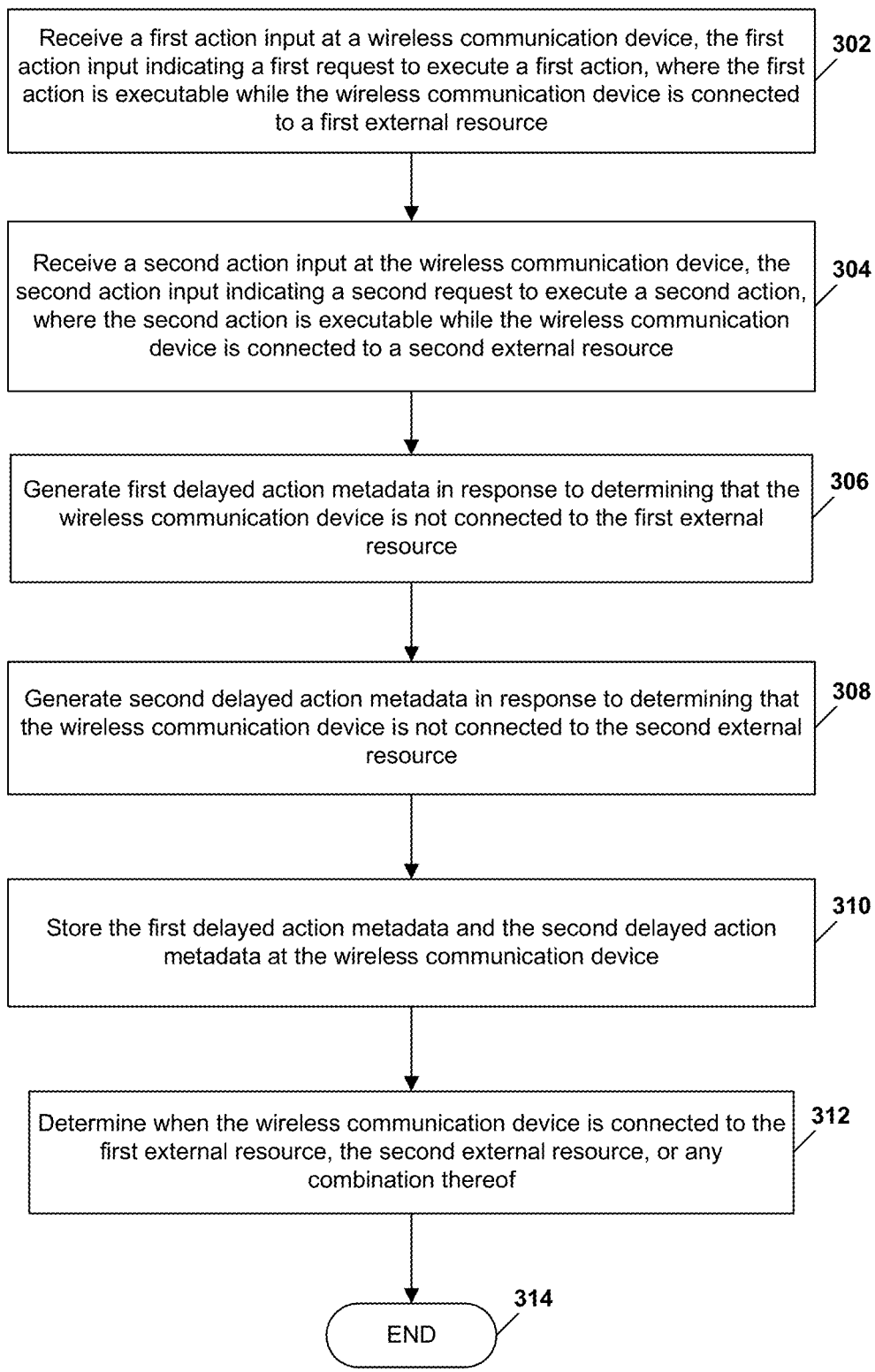
FIG. 3 is a flow diagram of a second embodiment of a method of interacting with data at a wireless communication device.

FIG. 3 is a flow diagram of a second embodiment of a method of interacting with data at a wireless communication device. A first action input is received at the wireless communication device, at 302. The first action input indicates a first request to execute a first action with respect to data stored at the wireless communication device. The first action is executable via the wireless communication device while the wireless communication device is connected to a first external resource. A second action input is received at the wireless communication device, at 304. The second action input indicates a second request to execute a second action with respect to data stored at the wireless communication device. The second action is executable via the wireless communication device while the wireless communication device is connected to a second external resource. For example, the first action input may relate to a request to print a picture stored at the wireless communication device and the second action input may relate to a request to record the picture.

Proceeding to 306, the wireless communication device generates first delayed action metadata in response to determining that the wireless communication device is not connected to the first external resource. At 308, the wireless communication device generates second delayed action metadata in response to determining that the wireless communication device is not connected to the second external resource. The first delayed action metadata may include metadata that identifies the first requested action, the first set of capabilities, and that the execution of the first action is to be delayed until the wireless communication device has access to the second set of capabilities. The second delayed action metadata may include metadata that identifies the second requested action, the second set of capabilities, and that the execution of the second action is to be delayed until the wireless communication device has access to the second set of capabilities.

Proceeding to 310, the first delayed action metadata and the second delayed action metadata are stored at the wireless communication device. In a particular embodiment, the first delayed action metadata and the second delayed action metadata are stored at the wireless communication device concurrently. In another particular embodiment, the method further includes storing a first indicator associated with the first delayed action metadata in a first queue and storing a second indicator associated with the second delayed action metadata in a second queue. In one embodiment, the first queue is associated with a first type of action and the second queue is associated with a second type of action. In another embodiment, the first queue is associated with the first external resource and the second queue is associated with the second external resource.

Proceeding to 312, the wireless communication device determines when the wireless communication device is connected to the first external resource, the second external resource, or any combination thereof. In a particular embodiment, the first external resource, the second external resource, or any combination thereof, is user selected. Optionally, when the wireless communication device is connected to an external resource, one or more actions may be automatically executed. The method terminates at 314.

In a particular embodiment, the method further includes monitoring one or more connections associated with the wireless communication device to determine when the wireless communication device is connected to the first external resource or the second external resource.

In another particular embodiment, the method further includes storing data type information indicating that the first action and the second action are executable with respect to a particular type of data stored at the wireless communication device and storing action capability information indicating that the first external resource is adapted to execute the first action and that the second external resource is adapted to execute the second action.

In another particular embodiment, the method further includes providing a graphical user interface indicating that the wireless communication device requires additional software to initiate execution of the first action, additional software to initiate execution of the second action, connection to additional hardware to initiate execution of the first action, connection to additional hardware to initiate execution of the second action, or any combination thereof.

Figure 4:
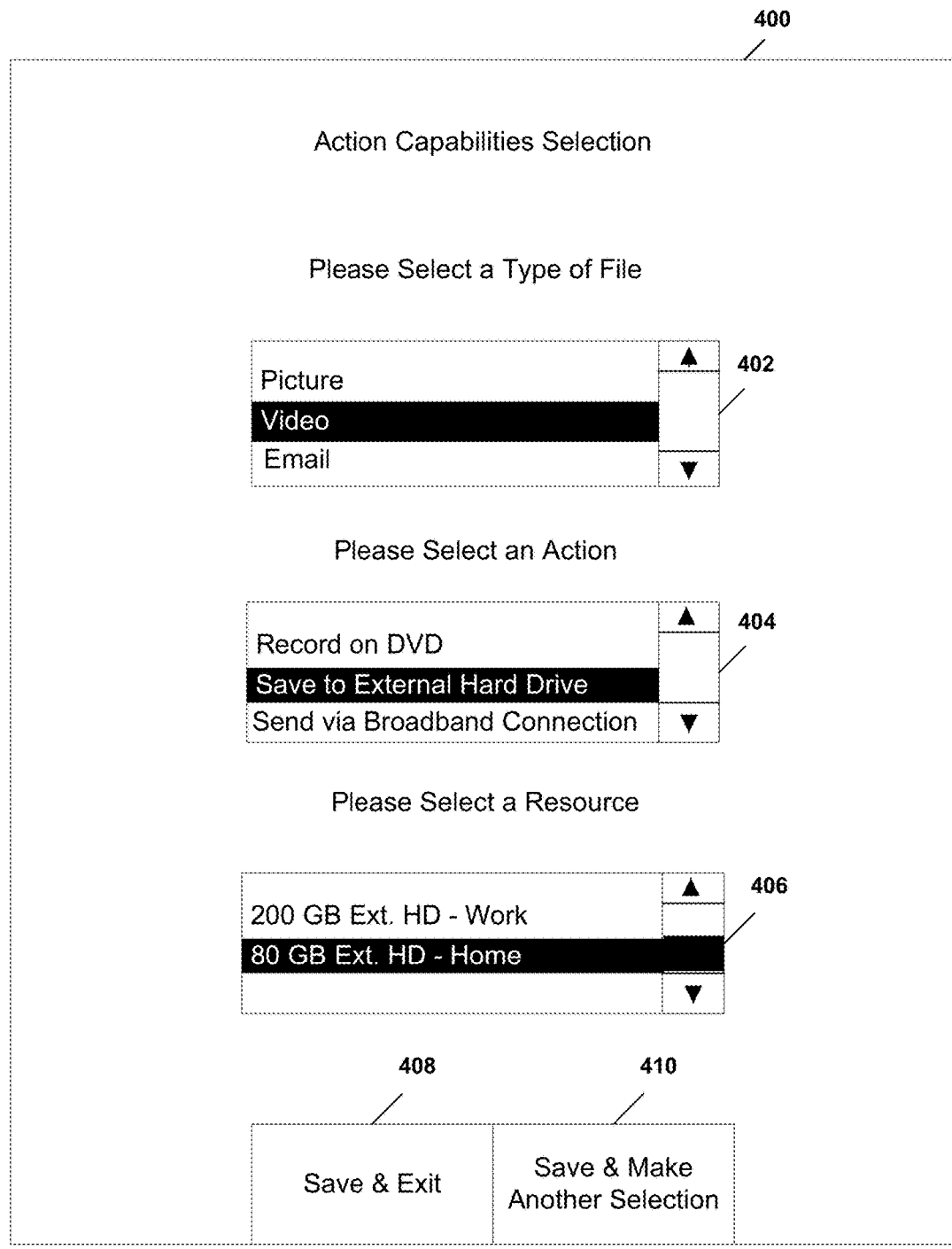
FIG. 4 is a diagram of an embodiment of a graphical user interface to interact with data at a wireless communication device.

FIG. 4 is a diagram of an embodiment of a graphical user interface (GUI) 400 to interact with data at a wireless communication device. The GUI 400 is adapted to receive action capabilities selection inputs from a user of a wireless communication device. The action capabilities selection inputs are related to user selected capabilities with respect to a particular action that may be executed via the wireless communication device. The GUI 400 includes a first window 402. The first window 402 is adapted to allow a user of the wireless communication device to select a type of data stored at the wireless communication device. The first window 402 indicates that a video data item has been selected from a list of data types by highlighting the video file type. The video data item may have been generated via the wireless communication device or received from a remote computing device.

The GUI 400 also includes a second window 404. The second window 404 is adapted to allow a user of the wireless communication device to select one or more actions that may be executed with respect to a particular type of data. The second window 404 indicates that the action "Save to External Hard Drive" has been selected from a list of possible actions that may be executed with respect to a video file type. The window 404 may include all actions executable via the wireless communication device, but the GUI 400 may only allow selection of actions associated with a selected type of data. To illustrate, certain actions, such as "Record on DVD" may be unavailable with an email file type and may appear grayed-out in the window 404 and not selectable. Further, the list of actions shown in the second window 404 may be different for each type of data. For example, the second window 404 may include actions, such as "Record on CD" and "Print" for a picture file. Additionally, the list of actions provided in the second window 404 may be user selected, included in a default configuration file, or any combination thereof.

Further, the GUI 400 includes a third window 406. The third window 406 is adapted to allow a user of the wireless communication device to select a resource that is adapted to execute a particular selected action. The third window 406 indicates that a user of the wireless communication device has selected an 80 gigabyte (GB) external hard drive that is located at the home of the user to execute the selected "Save to External Hard Drive" action. The inputs can be received via a keypad or the GUI 400 can be implemented via a touch screen. The resources included in the third window 406 may be user selected, included in a default configuration file, or any combination thereof.

Additionally, the GUI 400 may be used to select multiple actions for a particular data type, multiple resources for a particular action, or any combination thereof. In particular, the selectable icon 408 relates to saving specified action capabilities selections and exiting the GUI 400 and the selectable icon 410 relates to saving specified action capabilities selections and making further action capabilities selections. For example, the GUI 400 may be adapted to select a further action for a particular data type via the second window 404 or an additional resource for a particular action via the third window 406. In another example, the GUI 400 may be adapted to select an additional data type via the first window 402 and the actions and corresponding resources that are to be associated with the additional data type via the second window 404 and the third window 406, respectively.

Figure 5:
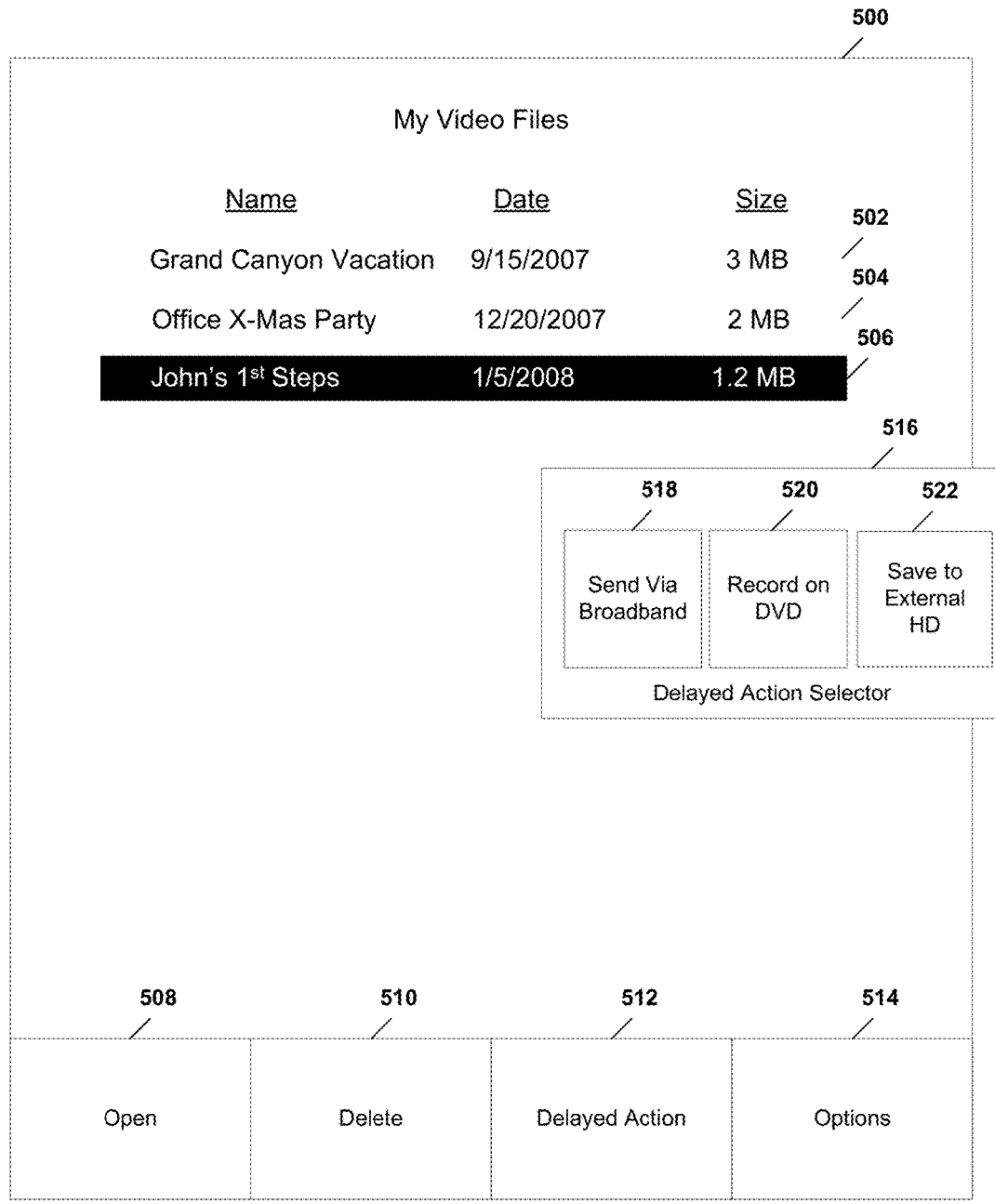
FIG. 5 is a diagram of a second embodiment of a graphical user interface to interact with data at a wireless communication device.

FIG. 5 is a diagram of a second embodiment of a graphical user interface (GUI) 500 to interact with data at a wireless communication device. The GUI 500 includes a list of video files stored at a wireless communication device. The list of video files includes data items 502, 504, and 506. Each of data items 502, 504, 506 includes name data, date information, and size data. For example, the data item 506 includes name data of "John's 1$^{st}$ Steps," date information of Jan. 5, 2008, and size data of 1.2 megabytes (MB). The GUI 500 indicates that the data item 506 has been selected by a user of the wireless communication device.

The GUI 500 also includes selectable icons 508-514. The selectable icon 508 is related to opening a data item stored at the wireless communication device to view the contents of the selected data item. The selectable icon 510 is related to deleting the contents of a selected data item from the memory of the wireless communication device. The selectable icon 512 is related to marking the particular data item, such that the execution of a particular action with respect to a selected data item is delayed. The selectable icon 514 is related to providing further options with respect to a selected data item. The further options may include providing further details about the data item, such as a playing time of a video file, editing the name of the data item, and so forth.

The graphical user interface 500 also includes a delayed action selector 516 that includes a number of data actions related to a selected data item. The delayed action selector 516 includes a number of selectable icons 518-522 related to the data actions. The GUI 500 may include the delayed action selector 516 in response to a selection of the "Delayed Action" icon 512, or the GUI 500 may include the delayed action selector 516 in response to an input received via a user input device, such as a keypad. In an illustrative, non-limiting embodiment, the keypad includes a "Delayed Action" button or a button associated with a delayed action feature.

The delayed action selector 516 includes selectable icons 518-522. The selectable icon 518 is related to sending a selected data item to a destination device via a broadband connection. The selectable icon 520 is related to recording a selected video file on a DVD and the selectable icon 522 is related to saving a selected video file to an external hard drive. In an illustrative embodiment, one or more of the data item actions may be selected with respect to a particular data item. In other embodiments, the selectable icons may include icons related to printing a selected data item, faxing a selected data item, or recording a selected data item, among other alternatives. After selecting one of the selectable icons 518-522, the wireless communication device may mark the selected data item by generating and storing delayed action metadata identifying the actions that are to be executed with respect to the data item.

Each of the actions associated with the selectable icons 518-522 may be associated with a particular resource to execute the respective action. For example, the action associated with the selectable icon 518 of sending a particular data item via a broadband connection may be executed via a desktop computer that a wireless communication device may be connected to, such as via a local wireless connection or via a wireline connection. The wireline connection could be via a docking station. Additionally, the sending of a particular data item via a broadband connection may be executed when the wireless communication device has access to wireless data services and when the wireless communication device has access to a specified data transmission capacity. In an illustrative, non-limiting embodiment, upon selection of one of the selectable icons 518-522, one or more additional graphical user interfaces may be provided that are related to selecting a corresponding resource to execute the requested action.

Figure 6:
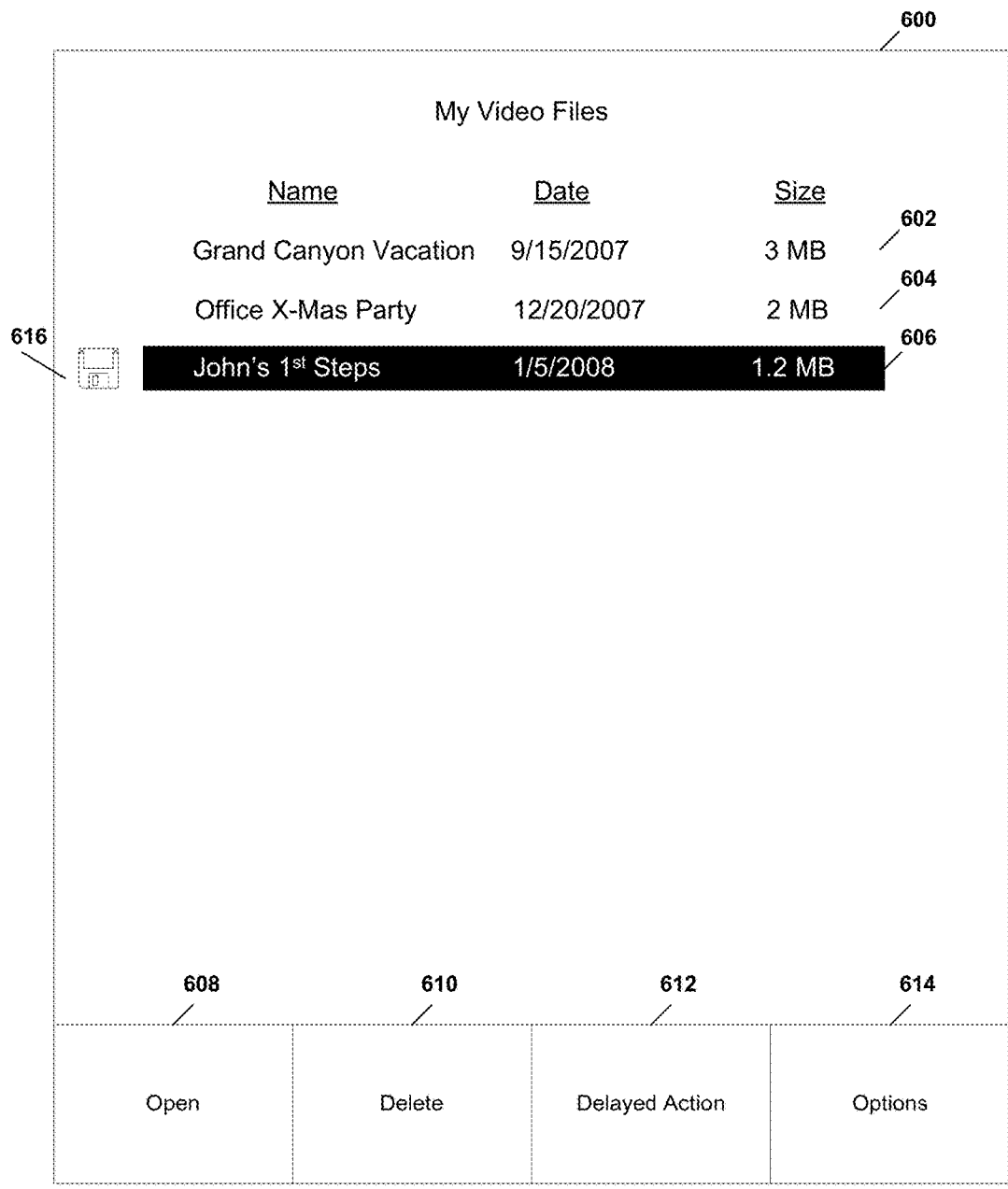
FIG. 6 is a diagram of a third embodiment of a graphical user interface to interact with data at a wireless communication device.

FIG. 6 is a diagram of a third embodiment of a graphical user interface to interact with data at a wireless communication device. The GUI 600 provides an indication of receipt of an input at the delayed action selector of the first graphical user interface of the wireless communication device, such as the delayed action selector 516 of FIG. 5. For example, when a user selects the "Save to External HD" option 522 of FIG. 5, the user may receive an indication that the selection was received. In one embodiment, the indication of receipt of the input is displayed in an updated view of the same graphical user interface. In an alternative embodiment, as shown in FIG. 6, a second graphical user interface 600 is displayed that includes a delayed action designation icon 616 to indicate that the action is to be executed when the wireless communication device supports the second set of capabilities. In the embodiment shown, the delayed action designation icon 616 includes a save icon to indicate that the user selected the "Save to External HD" option 522 of FIG. 5. In a particular embodiment, when the wireless communication device supports the second set of capabilities, the delayed action designation icon 616 is replaced with an executed action icon (not shown). The executed action icon indicates that the action has been executed.

Figure 7:
FIG. 7 is a diagram of a fourth embodiment of a graphical user interface to interact with data at a wireless communication device.

FIG. 7 is a diagram of a fourth embodiment of a graphical user interface to interact with data at a wireless communication device. In the embodiment shown in FIG. 7, the GUI 700 includes a list of emails stored at a wireless communication device. The list of emails includes data items 702, 704, and 706. Each of the data items 702, 704, 706 includes name data, date information, and size data. For example, the data item 706 includes name data of "Travel Itinerary," date information of Jan. 5, 2008, and size data of 1.2 megabytes (MB). The GUI 700 indicates that the data item 706 has been selected by a user of the wireless communication device.

Depending on the selected action, the delayed action designation icon may include a print icon, a fax icon, an email icon, a save icon, a record icon, an upload icon, a download icon, or any combination thereof. For example, in the embodiment shown in FIG. 7, delayed action designation icon 716 includes a print icon to indicate that the user selected a "Print" option with respect to email item 702. Further, delayed action designation icon 718 includes a fax icon to indicate that the user selected a "Fax" option with respect to email item 704. Further, delayed action designation icon 720 includes a CD icon to indicate that the user selected a "Record on CD" option with respect to email item 706.

Figure 8:
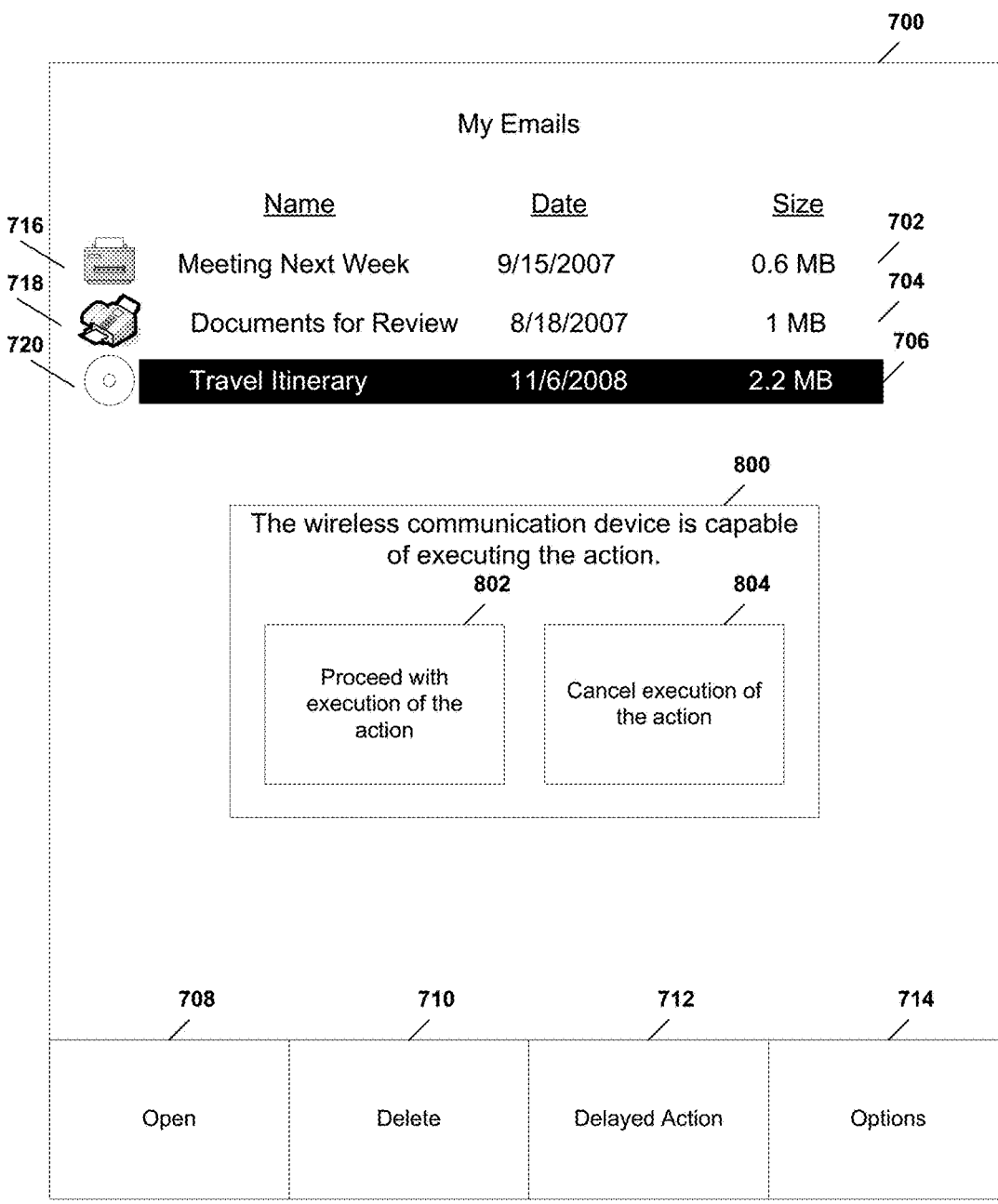
FIG. 8 is a diagram of a fifth embodiment of a graphical user interface to interact with data at a wireless communication device.

FIG. 8 is a diagram of a fifth embodiment of a graphical user interface to interact with data at a wireless communication device. In one embodiment, a second graphical user interface, such as the GUI 800 shown in FIG. 8, is provided in response to determining that the wireless communication device supports the second set of capabilities. The GUI 800 indicates that the wireless communication device is capable of executing the action and includes a first selectable option 802 to proceed with execution of the action and a second selectable option 804 to cancel execution of the action. For example, the wireless communication device may be capable of executing the "Record on CD" action with respect to email item 706. The user may select the first selectable option 802 to proceed with execution of the "Record on CD" action with respect to email item 706, or the user may cancel the "Record on CD" action.

Figure 9:
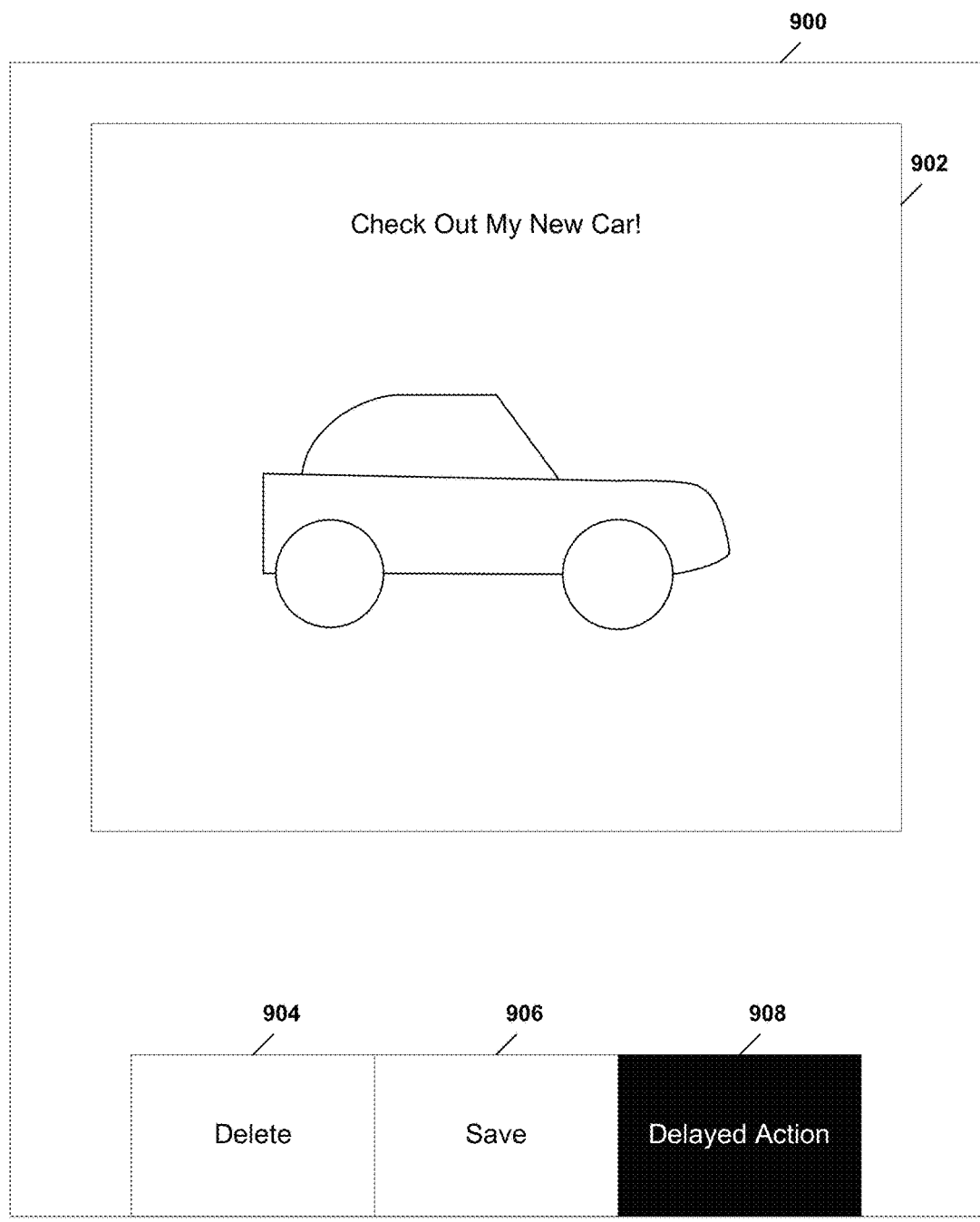
FIG. 9 is a diagram of a sixth embodiment of a graphical user interface to interact with data at a wireless communication device.

FIG. 9 is a diagram of a sixth embodiment of a graphical user interface to interact with data at a wireless communication device. The GUI 900 may be provided via the wireless communication device in response to a selection to open a picture message received at the wireless communication device. Alternatively, the GUI 900 may be provided via the wireless communication device after a selection of a picture message from a list of data items stored at the wireless communication device.

The GUI 900 includes a picture message 902 and selectable icons 904-908. The icon 904 is adapted to delete the picture message 902 from a memory of the wireless communication device and the selectable icon 906 is adapted to save the picture message 902 at the memory of the wireless communication device. The selectable icon 908 is adapted to mark the picture message 902 for delayed action. For example, a user of the wireless communication device may want to perform an action with respect to the picture message 902, such as to print the picture message, record the picture message on physical media (e.g., a CD), save the picture message to an external hard drive, or any combination thereof. However, if the wireless communication device is not connected to a resource to perform the desired action, then the selectable icon 908 may be selected to generate and store delayed action metadata with respect to the picture message 902. The delayed action metadata may indicate that execution of one or more actions with respect to the picture message 902 is to be delayed. After the selectable icon 908 has been selected, a menu of data item actions, such as the delayed action selector 516 of FIG. 5, may be provided so that a user of the wireless communication device can select the delayed actions to be executed with respect to the picture message 902 from the menu.

Alternatively, the GUI 900 may include a number of selectable icons that each relate to a particular action that can be executed with respect to the picture message 902. For example, the GUI 900 may include a selectable icon related to printing the picture message 902, a selectable icon related to recording the picture message 902 on a CD, a selectable icon related to saving the picture message 902 to an external hard drive, or any combination thereof. Delayed action metadata may be automatically generated with respect to the picture message 902 when an action is selected to be executed with respect to the picture message 902 and when the wireless communication device does not have access to a set of capabilities needed to execute the selected action at the time of the request.

After the delayed action metadata has been generated with respect to the picture message 902, an additional graphical user interface may be provided that relates to action execution options for the picture message 902. For example, the additional graphical user interface may include selectable icons related to setting an amount of time to delay execution of a requested action, such as 2 hours, or selectable icons related to setting a particular time to execute a requested action, such as 7:00 p.m. Additionally, the additional graphical user interface may include a selectable icon related to delaying execution of a requested action until the wireless communication device has access to a specified set of capabilities.

Figure 10:
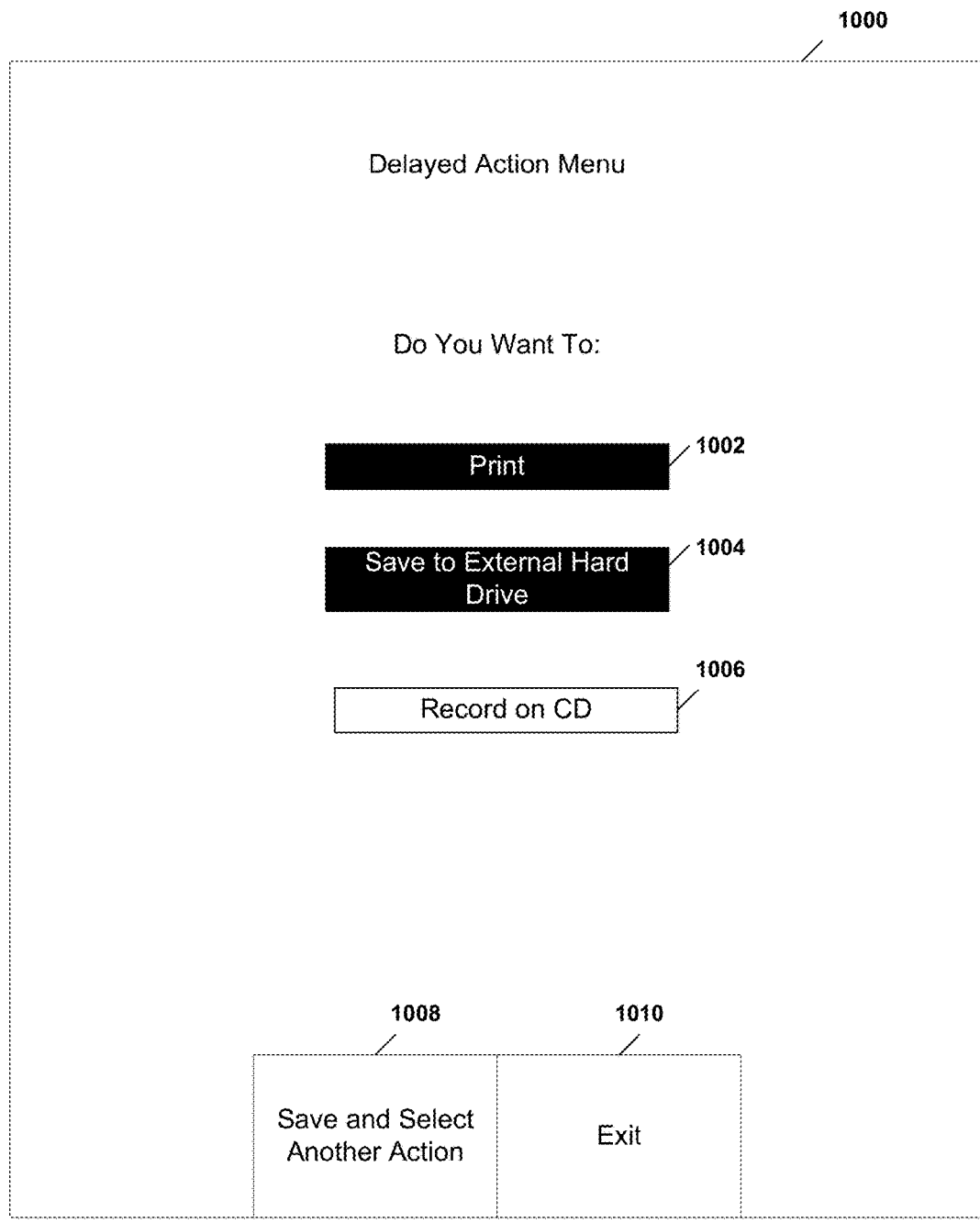
FIG. 10 is a diagram of a seventh embodiment of a graphical user interface to interact with data at a wireless communication device.

FIG. 10 is a diagram of a seventh embodiment of a graphical user interface 1000 to mark data for a delayed action at a wireless communication device. The GUI 1000 may be provided via the wireless communication device in response to a selection of the delayed action selectable icon 908 of the GUI 900 illustrated in FIG. 9. The GUI 1000 includes a delayed action menu that includes a number of selectable icons 1002-1006 associated with actions that may be executed with respect to a particular data item, such as the picture message 902 of FIG. 9. A user of the wireless communication device may select more than one action to be executed with respect to the particular data item. The GUI 1000 indicates that the selectable icons 1002 and 1004 have been selected to be executed with respect to a particular data item by highlighting the selectable icons 1002 and 1004.

The GUI 1000 also includes selectable icons 1008 and 1010. The selectable icon 1008 is adapted to allow a user of the wireless communication device to select a particular action to execute with respect to a data item and then to select another action to execute from the selectable icons 1002-1006. Alternatively, a number of selectable icons 1002-1006 can be selected in succession without choosing the selectable icon 1008 between the selection of each option. The selectable icon 1010 is related to exiting the GUI 1000 and proceeding to a different graphical user interface provided via the wireless communication device. Delayed action metadata may be generated that identifies each of the actions that are to be executed with respect to the particular data item after selection of one or more of the selectable icons 1002-1006 when the wireless communication device does not have access to the set of capabilities to execute the requested action.

Figure 11:
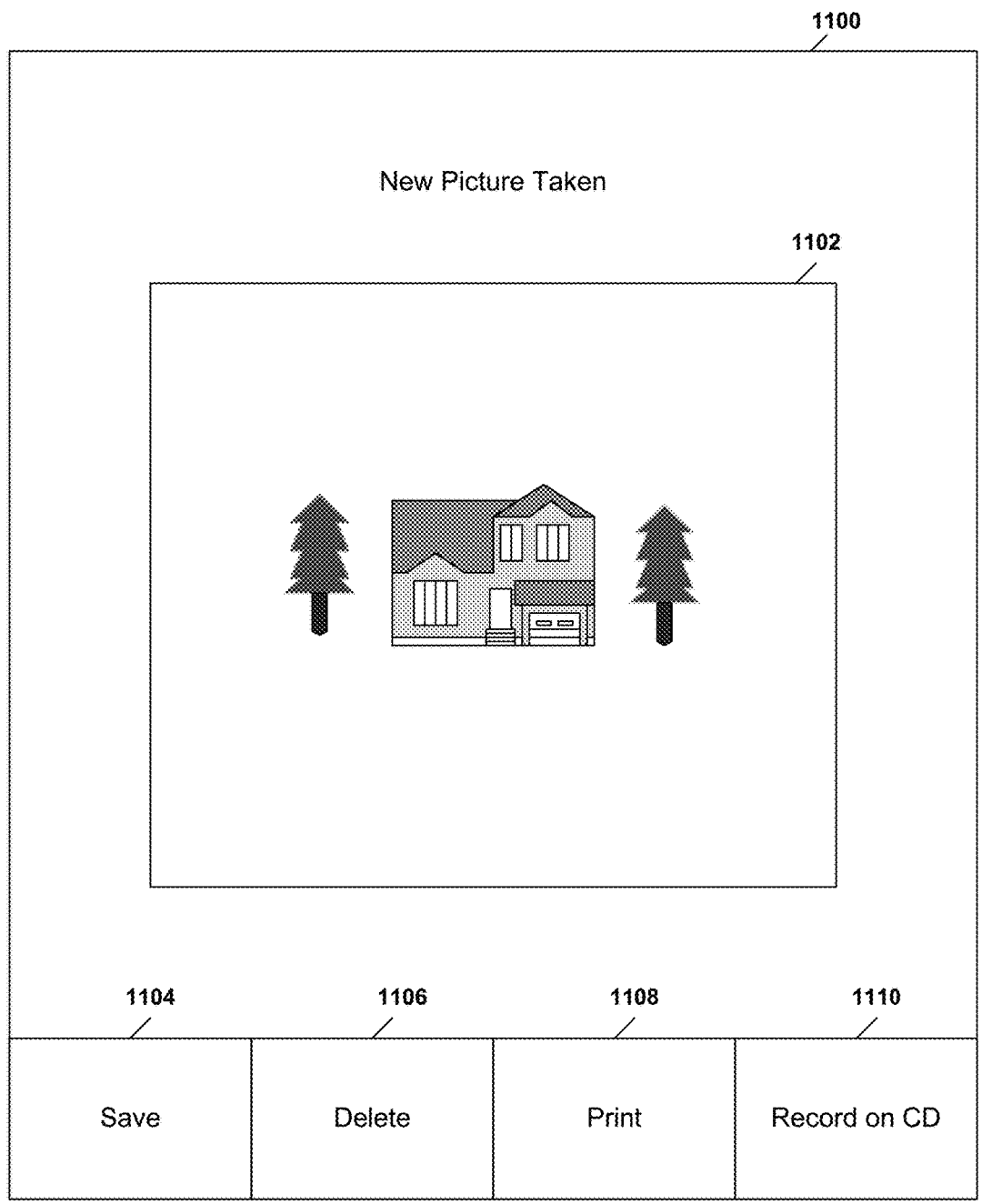
FIG. 11 is a diagram of an eighth embodiment of a graphical user interface to interact with data at a wireless communication device.

FIG. 11 is a diagram of an eighth embodiment of a graphical user interface (GUI) 1100 to interact with data at a wireless communication device. The GUI 1100 includes a picture 1102 that has been taken via the wireless communication device. The picture 1102 may have been generated after executing a picture taking application of the wireless communication device in response to an input via a keypad or touch screen of the wireless communication device. Graphical user interfaces similar to the GUI 1100 may be provided in response to the execution of other applications of the wireless communication device, such as a text editor application or a video filming application. The GUI 1100 includes selectable icons 1104-1110. The selectable icon 1104 is related to saving the picture 1102 at the wireless communication device, and the selectable icon 1106 is related to deleting the picture 1102. The selectable icon 1108 is related to printing the picture 1102, and the selectable icon 1110 is related to recording the picture 1102 on a CD.

Upon selection of the selectable icons 1108 or 1110, delayed action metadata is generated when the wireless communication device does not have access to a set of capabilities to execute the requested action. For example, upon selection of the selectable icon 1108, delayed action metadata is generated when the wireless communication device is not connected to a printer. In another example, upon selection of the selectable icon 1110, delayed action metadata is generated when the wireless communication device is not connected to a CD device. The delayed action metadata may indicate the action associated with the selected icon, a set of capabilities adapted to execute the action, and that the execution of the action is to be delayed until the wireless communication device has access to a specified set of capabilities. The GUI 1100 may include more selectable icons than those shown in FIG. 11 and the GUI 1100 may include different selectable icons for each type of data item that can be generated via the wireless communication device. For example, after generating a video file using a video filming application, the GUI 1100 may include selectable icons related to sending the video file via a broadband connection and recording the video file on a DVD.

Alternatively, instead of including selectable icons 1108-1110, the GUI 1100 may include a delayed action selectable icon. The delayed action selectable icon may allow a user of the wireless communication device to mark a data item generated via the wireless communication device to perform an action with respect to the data item at a later time. In response to selecting the delayed action selectable icon, a menu of selectable icons may be provided that is similar to the menu of selectable icons 1002-1006 in FIG. 10 that includes a number of selectable icons related to actions that may be executed with respect to the particular data item. The actions that are included in the menu may depend on the type of data item.

Figure 12:
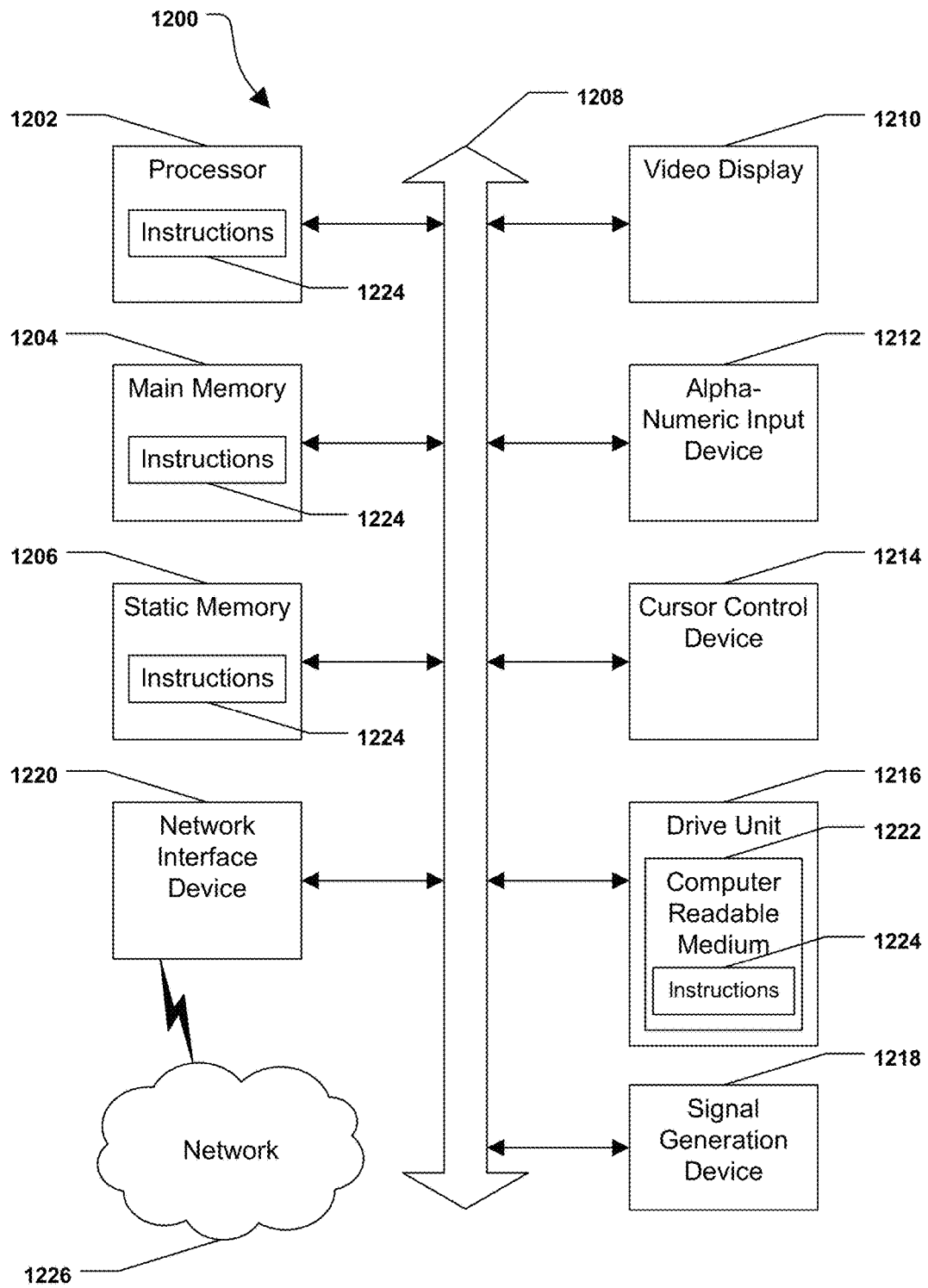
FIG. 12 is a block diagram of an illustrative general computer system.

Referring to FIG. 12, an illustrative embodiment of a general computer system is shown and is designated 1200. The computer system 1200 can include a set of instructions that can be executed to cause the computer system 1200 to perform any one or more of the methods or computer based functions disclosed herein. The computer system 1200, or any portion thereof, may operate as a standalone device or may be connected, e.g., using a network, to other computer systems or peripheral devices, including a service provider server, a wireless communication device, a remote computing device, or one or more external resources, as shown in FIG. 1. For example, the computer system 1200 may be used to perform the computer based functions of the wireless communication device 102 or the service provider server 140.

The computer system 1200 can also be implemented as or incorporated into various devices, such as a personal computer (PC), a tablet PC, a personal digital assistant (PDA), a mobile device, a palmtop computer, a laptop computer, a communications device, a wireless telephone, a camera, a pager, a personal trusted device, a web appliance, or any other machine capable of executing a set of instructions (sequential or otherwise) that specify actions to be taken by that machine. In a particular embodiment, the computer system 1200 can be implemented using electronic devices that provide voice, video or data communication. Further, while a single computer system 1200 is illustrated, the term "system" shall also be taken to include any collection of systems or sub-systems that individually or jointly execute a set, or multiple sets, of instructions to perform one or more computer functions.

As illustrated in FIG. 12, the computer system 1200 may include a processor 1202, e.g., a central processing unit (CPU), a graphics-processing unit (GPU), or both. Moreover, the computer system 1200 can include a main memory 1204 and a static memory 1206 that can communicate with each other via a bus 1208. As shown, the computer system 1200 may further include a video display unit 1210, such as a liquid crystal display (LCD), an organic light emitting diode (OLED), a flat panel display, or a solid state display. Additionally, the computer system 1200 may include an input device 1212, such as a keyboard, and a cursor control device 1214, such as a mouse. For example, the input device 1212 may include an input/output device of a smart phone. The computer system 1200 can also include a disk drive unit 1216, a signal generation device 1218, such as a speaker or remote control, and a network interface device 1220.

In a particular embodiment, as depicted in FIG. 12, the disk drive unit 1216 may include a computer-readable medium 1222 in which one or more sets of instructions 1224, e.g. software, can be embedded. Further, the instructions 1224 may embody one or more of the methods or logic as described herein. In a particular embodiment, the instructions 1224 may reside completely, or at least partially, within the main memory 1204, the static memory 1206, and/or within the processor 1202 during execution by the computer system 1200. The main memory 1204 and the processor 1202 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1224 or receives and executes instructions 1224 responsive to a propagated signal, so that a device connected to a network 1226 can communicate voice, video or data over the network 1226. Further, the instructions 1224 may be transmitted or received over the network 1226 via the network interface device 1220.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a tangible storage medium. Accordingly, the disclosure is considered to include any one or more of a computer-readable medium or other equivalents and successor media, in which data or instructions may be stored.

Although the present specification describes components and functions that may be implemented in particular embodiments with reference to particular standards and protocols, the invention is not limited to such standards and protocols. For example, standards for wireless communications (e.g., Global System for Mobile (GSM), Code Division Multiple Access (CDMA), CDMA 2000, Third Generation (3G), Fourth Generation (4G)), Long Term Evolution (LTE), Bluetooth, Wireless Fidelity (WiFi), Worldwide Operability for Microwave Access (WiMAX), Picocell, Femtocell, and Ultra-wideband (UWB)) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A wireless communication device, comprising:
   a processor;
   a display device; and
   a memory coupled to the processor, the memory including instructions executable by the processor to perform operations, the operations comprising:
      receiving a communication request input, wherein the communication request input identifies an action to be executed with respect to a data file, the action executable by the processor when the processor has access to a set of capabilities, and wherein the communication request input is received when the processor does not have access to the set of capabilities;
      generating delayed action metadata associated with the data file in response to the communication request input, wherein the delayed action metadata indicates that the action is to be executed responsive to the processor being connected via a wireless wide area network to a first external resource associated with the set of capabilities within a time period, and wherein the delayed action metadata indicates that the action is to be executed responsive to the processor connecting to a second external resource associated with the set of capabilities after the time period; and
      upon detecting that the processor has not connected to the first external resource within the time period, sending a transmission based on the delayed action metadata via the wireless wide area network to the second external resource to execute the action.

2. The wireless communication device of claim 1, wherein the operations further comprise:
   allocating a portion of the memory; and
   storing the delayed action metadata in the portion of the memory.

3. The wireless communication device of claim 1, wherein the delayed action metadata includes a pointer, wherein the operations further comprise storing the pointer in a file that includes additional pointers, and wherein each of the additional pointers is related to other delayed action metadata.

4. The wireless communication device of claim 1, wherein the communication request input corresponds to a download request or an upload request.

5. The wireless communication device of claim 1, wherein the first external resource, the second external resource, or both, are selected based on a data type of the data file.

6. The wireless communication device of claim 1, wherein the memory stores data type information for a plurality of data types, and wherein the data type of the data file is indicated by the data type information.

7. The wireless communication device of claim 6, wherein the data type information for each respective data type of the plurality of data types indicates whether an action associated with the respective data type can be delayed.

8. A computer-readable storage device storing instructions executable by a processor to perform operations comprising:
   receiving a communication request input, wherein the communication request input identifies an action to be executed with respect to a data file, the action executable by the processor when the processor has access to a set of capabilities, and wherein the communication request input is received when the processor does not have access to the set of capabilities;
   generating delayed action metadata associated with the data file in response to the communication request input, wherein the delayed action metadata indicates that the action is to be executed responsive to the processor being connected via a wireless wide area network to a first external resource associated with the set of capabilities within a time period, and wherein the delayed action metadata indicates that the action is to be executed responsive to the processor connecting to a second external resource associated with the set of capabilities after the time period; and
   upon detecting that the processor has not connected to the first external resource within the time period, sending a transmission based on the delayed action metadata via the wireless wide area network to the second external resource to execute the action.

9. The computer-readable storage device of claim 8, wherein the operations further comprise:
   receiving a second action request input, wherein the second action request input identifiers a second action to be executed with respect to the data file, the second action being executable by the processor when the processor has access to a particular capability not included in the set of capabilities; and
   generating second delayed action metadata associated with the data file in response to determining that the processor does not have access to the particular capability.

10. The computer-readable storage device of claim 9, wherein the operations further comprise executing the second action when the processor obtains access to the particular capability.

11. The computer-readable storage device of claim 8, wherein the communication request input corresponds to an upload request or a download request.

12. The computer-readable storage device of claim 8, wherein the first external resource, the second external resource, or both, are selected based on a data type of the data file.

13. The computer-readable storage device of claim 8, wherein the processor is a component of a wireless communications device.

14. The computer-readable storage device of claim 8, wherein the operations further comprise sending the transmission based on the delayed action metadata via the wireless wide area network to the second external resource to execute the action when the processor connects to the first external resource within the time period and the first external resource is busy.

15. A method comprising:
   receiving an input at a wireless communication device, the input indicating a request to execute an action with respect to a data file, wherein the action is executable at the wireless communication device via a wireless wide area network while the wireless communication device is connected to a first external resource, and wherein the input is received when the wireless communication device is not connected via the wireless wide area network to the first external resource;

generating delayed action metadata in response to the input, the delayed action metadata indicating that the action is to be executed by the wireless communication device responsive to the wireless communication device being connected via the wireless wide area network to the first external resource within a time period and indicating that the action is to be executed responsive to the wireless communication device connecting to a second external resource after the time period;

storing the delayed action metadata at the wireless communication device; and upon detecting that the wireless communication device has not connected to the first external resource within the time period, sending a transmission based on the delayed action metadata via the wireless wide area network to the second external resource to execute the action.

16. The method of claim 15, further comprising monitoring connections associated with the wireless communication device to determine when the wireless communication device is connected to the first external resource via the wireless wide area network.

17. The method of claim 15, further comprising storing action capability information indicating that the first external resource and the second external resource are usable to execute the action and indicating a preference to use the first external resource to execute the action.

18. The method of claim 15, further comprising:
storing a first indicator associated with the delayed action metadata in a first queue; and
storing a second indicator associated with second delayed action metadata in a second queue.

19. The method of claim 18, wherein the first queue is associated with a first type of action and the second queue is associated with a second type of action.

20. The method of claim 18, further comprising identifying the first external resource, the second external resource, and the time period based on configuration data stored at the wireless communication device.

* * * * *